(12) United States Patent  
Radtke et al.

(10) Patent No.: US 8,718,535 B2  
(45) Date of Patent: May 6, 2014

(54) DATA COLLECTION AND TRANSFER TECHNIQUES FOR SCANNABLE FORMS

(75) Inventors: Todd Nelson Radtke, Hastings, MN (US); Hugh Eugene Watson, Prior Lake, MN (US); Jason Lee Sprenger, Savage, MN (US)

(73) Assignee: Scantron Corporation, Irvine, CA (US)

( * ) Notice: Subject to any disclaimer, the term of this patent is extended or adjusted under 35 U.S.C. 154(b) by 88 days.

(21) Appl. No.: 13/015,755

(22) Filed: Jan. 28, 2011

(65) Prior Publication Data

US 2011/0189647 A1 Aug. 4, 2011

Related U.S. Application Data

(60) Provisional application No. 61/299,507, filed on Jan. 29, 2010.

(51) Int. Cl.
*G09B 3/00* (2006.01)
*G09B 3/06* (2006.01)

(52) U.S. Cl.
USPC .......................................................... 434/353

(58) Field of Classification Search
USPC ................... 434/355, 363, 353; 382/183, 184
See application file for complete search history.

(56) References Cited

U.S. PATENT DOCUMENTS

| | | |
|---|---|---|
| 3,050,248 A | 8/1962 | Lindquist |
| 3,445,942 A | 5/1969 | Azure |
| 3,900,961 A | 8/1975 | Sokolski et al. |
| 4,424,587 A | 1/1984 | Wevelsiep et al. |
| 4,478,584 A * | 10/1984 | Kaney ........................... 434/353 |
| 4,517,622 A | 5/1985 | Male |
| 4,764,120 A | 8/1988 | Griffin et al. |
| 4,768,087 A | 8/1988 | Taub et al. |
| 4,793,813 A | 12/1988 | Bitzer et al. |
| 4,857,715 A | 8/1989 | Koch et al. |

(Continued)

FOREIGN PATENT DOCUMENTS

| | | |
|---|---|---|
| FR | 2728984 A1 | 7/1996 |
| WO | 01/16691 A1 | 3/2001 |
| WO | 02/31799 A1 | 4/2002 |
| WO | 2008/134421 A2 | 11/2008 |

OTHER PUBLICATIONS

International Search Report, Application Serial No. PCT/US08/61412, Oct. 15, 2008, 17 pages.

(Continued)

*Primary Examiner* — Kathleen Mosser  
*Assistant Examiner* — Peter J Alley  
(74) *Attorney, Agent, or Firm* — Fish & Richardson P.C.

(57) ABSTRACT

Implementations feature scannable form techniques and systems. Some aspects feature a scannable form including at least one response column parallel to a first longitudinal edge of the scannable form, and a broken ladder having two substantially parallel lines with locations for multiple rungs corresponding to encoded information that identifies a person assigned to the scannable form. A top rung is positioned on the scannable form so that the top rung can be a first rung that is scanned by a test scoring machine for the broken ladder, and a bottom rung is positioned so that the bottom rung can be a last rung that is scanned by the test scoring machine for the broken ladder. Other aspects feature a method to determine correct scoring key data in the test scoring machine for a test, and a method of transmitting information between the test scoring machine and a portable memory device.

39 Claims, 18 Drawing Sheets

(56) References Cited

U.S. PATENT DOCUMENTS

| | | | |
|---|---|---|---|
| 4,937,439 A | 6/1990 | Wanninger et al. | |
| 5,085,587 A | 2/1992 | DesForges et al. | |
| 5,161,118 A | 11/1992 | Matsuda et al. | |
| 5,184,003 A * | 2/1993 | McMillin et al. | 235/454 |
| 5,273,437 A | 12/1993 | Caldwell et al. | |
| 5,303,042 A | 4/1994 | Lewis et al. | |
| 5,379,213 A | 1/1995 | Derks | |
| 5,420,407 A | 5/1995 | Grundy, Jr. | |
| 5,437,555 A | 8/1995 | Ziv-El | |
| 5,453,600 A * | 9/1995 | Swartz | 235/375 |
| 5,513,994 A | 5/1996 | Kershaw et al. | |
| 5,586,889 A | 12/1996 | Goodman | |
| 5,618,182 A | 4/1997 | Thomas | |
| 5,640,152 A | 6/1997 | Copper | |
| 5,704,029 A | 12/1997 | Wright | |
| 5,712,906 A | 1/1998 | Grady et al. | |
| 5,724,357 A | 3/1998 | Derks | |
| 5,730,602 A | 3/1998 | Gierhart et al. | |
| 5,743,746 A | 4/1998 | Ho et al. | |
| 5,769,643 A | 6/1998 | Stevens, III | |
| 5,775,918 A | 7/1998 | Yanagida et al. | |
| 5,779,486 A | 7/1998 | Ho et al. | |
| 5,823,788 A | 10/1998 | Lemelson et al. | |
| 5,833,468 A | 11/1998 | Guy et al. | |
| 5,842,871 A | 12/1998 | Cutler et al. | |
| 5,850,250 A | 12/1998 | Konopka et al. | |
| 5,852,434 A | 12/1998 | Sekendur | |
| 5,945,656 A | 8/1999 | Lemelson et al. | |
| 5,947,747 A | 9/1999 | Walker et al. | |
| 5,974,444 A | 10/1999 | Konrad | |
| 6,018,617 A | 1/2000 | Sweitzer et al. | |
| 6,079,624 A | 6/2000 | Apperson et al. | |
| 6,086,381 A | 7/2000 | Downs et al. | |
| 6,112,049 A | 8/2000 | Sonnenfeld | |
| 6,120,299 A | 9/2000 | Trenholm et al. | |
| 6,144,838 A | 11/2000 | Sheehan | |
| 6,149,441 A | 11/2000 | Pellegrino et al. | |
| 6,155,840 A | 12/2000 | Sallette | |
| 6,162,060 A | 12/2000 | Richard et al. | |
| 6,164,975 A | 12/2000 | Weingarden et al. | |
| 6,175,841 B1 | 1/2001 | Loiacono | |
| 6,181,910 B1 | 1/2001 | Jerrold-Jones et al. | |
| 6,198,904 B1 | 3/2001 | Rosen | |
| 6,263,439 B1 | 7/2001 | Hondros et al. | |
| 6,272,245 B1 | 8/2001 | Lin | |
| 6,330,976 B1 | 12/2001 | Dymetman et al. | |
| 6,366,760 B1 | 4/2002 | Kucinski et al. | |
| 6,419,496 B1 | 7/2002 | Vaughan | |
| 6,427,063 B1 | 7/2002 | Cook et al. | |
| 6,549,751 B1 | 4/2003 | Mandri | |
| 6,570,104 B1 | 5/2003 | Ericson et al. | |
| 6,663,008 B1 | 12/2003 | Pettersson et al. | |
| 6,667,695 B2 | 12/2003 | Pettersson et al. | |
| 6,674,427 B1 | 1/2004 | Pettersson et al. | |
| 6,695,216 B2 | 2/2004 | Apperson | |
| 6,736,319 B2 | 5/2004 | Swanson et al. | |
| 6,752,317 B2 | 6/2004 | Dymetman et al. | |
| 6,760,748 B1 | 7/2004 | Hakim | |
| 6,786,396 B2 | 9/2004 | Constantine | |
| 6,807,535 B2 | 10/2004 | Goodkovsky | |
| 6,810,232 B2 | 10/2004 | Knowles et al. | |
| 6,964,374 B1 | 11/2005 | Djuknic et al. | |
| 6,968,085 B2 | 11/2005 | Bern et al. | |
| 6,970,267 B1 | 11/2005 | Scanlon | |
| 7,068,861 B2 | 6/2006 | Swanson et al. | |
| 7,167,164 B2 | 1/2007 | Ericson et al. | |
| 7,298,901 B2 | 11/2007 | McIntosh et al. | |
| 7,889,929 B2 | 2/2011 | Ashikaga | |
| 8,155,578 B2 * | 4/2012 | Cody | 434/358 |
| 2001/0018178 A1 | 8/2001 | Siefert | |
| 2002/0031755 A1 | 3/2002 | Lo et al. | |
| 2002/0090565 A1 | 7/2002 | Griffith et al. | |
| 2002/0107681 A1 | 8/2002 | Goodkovsky | |
| 2003/0017442 A1 | 1/2003 | Tudor et al. | |
| 2003/0042299 A1 | 3/2003 | Swanson | |
| 2003/0108856 A1 | 6/2003 | Masuda | |
| 2003/0180703 A1 | 9/2003 | Yates et al. | |
| 2004/0085287 A1 | 5/2004 | Wang et al. | |
| 2004/0086191 A1 | 5/2004 | Wang et al. | |
| 2005/0226541 A1 * | 10/2005 | McIntosh et al. | 382/306 |
| 2005/0237580 A1 | 10/2005 | Coleman et al. | |
| 2005/0238260 A1 | 10/2005 | Coleman et al. | |
| 2005/0255439 A1 * | 11/2005 | Cody | 434/353 |
| 2006/0003306 A1 | 1/2006 | McGinley et al. | |
| 2006/0081714 A1 | 4/2006 | King et al. | |
| 2006/0082557 A1 | 4/2006 | Ericson et al. | |
| 2006/0151602 A1 | 7/2006 | Hawkins et al. | |
| 2006/0202031 A1 | 9/2006 | Chung et al. | |
| 2006/0255145 A1 | 11/2006 | Chung et al. | |
| 2007/0031802 A1 | 2/2007 | Koyama et al. | |
| 2007/0170253 A1 | 7/2007 | Chung et al. | |
| 2008/0112564 A1 * | 5/2008 | Vanderstraeten | 380/243 |
| 2008/0264701 A1 * | 10/2008 | Radtke et al. | 178/19.01 |
| 2009/0020606 A1 | 1/2009 | Chung et al. | |
| 2009/0116748 A1 | 5/2009 | Davison et al. | |
| 2009/0186327 A1 | 7/2009 | McGinley et al. | |
| 2009/0201541 A1 | 8/2009 | Neogi et al. | |
| 2009/0242639 A1 | 10/2009 | Holenstein et al. | |
| 2009/0289115 A1 | 11/2009 | Chung et al. | |
| 2010/0012541 A1 | 1/2010 | Neary | |
| 2010/0047757 A1 | 2/2010 | McCurry et al. | |
| 2010/0068688 A1 | 3/2010 | Shapiro | |

OTHER PUBLICATIONS

Anoto Group AB, 1 page, http://www.anotofunctionality.com/?id=917 (visited Apr. 23, 2008).

Skills Connection, 2000-2001, 2 pages, http://www.edvision.com/skillsconnection/sc_details.html (visited Aug. 22, 2001).

Argus Communications, 2000, 1 page, http://www.argus.com/ (visited Aug. 9, 2001).

LearnStar Mission, 2001, 4 pages, http://www.learnstar.com/about_us.html (visited Aug. 8, 2001).

Renaissance Learning, 2001, 6 pages, http://www.renlearn.com/aboutus.htm (visited Aug. 7, 2001).

News Release. Renaissance Learning Announces New Software Products Wisconsin Rapids, WI. Jan. 24, 2001, 2 pages.

Richards et al., U.S. Appl. No. 10/647,103, filed Aug. 21, 2003, entitled "Attendance Module", 151 pages.

Nobis et al., U.S. Appl. No. 10/236,528, filed Sep. 6, 2002, entitled "Infrared Information Exchange", 109 pages.

Non-Final Office Action issued in U.S. Appl. No. 10/236,528, on Mar. 2, 2004, 8 pages.

Nobis et al., U.S. Appl. No. 10/236,493, filed Sep. 6, 2002, entitled "Network-Based Testing", 114 pages.

Non-Final Office Action issued in U.S. Appl. No. 10/236,493, on Jan. 3, 2005, 9 pages.

Non-Final Office Action issued in U.S. Appl. No. 10/174,085, on Sep. 3, 2004, 8 pages.

Final Office Action issued in U.S. Appl. No. 10/174,083, on Apr. 7, 2005, 8 pages.

International Search Report and Written Opinion for International Application No. PCT/US11/22424 mailed Jun. 1, 2011, 15 pages.

International Preliminary Report on Patentability in International Application No. PCT/US2011/22424, mailed Jun. 11, 2012, 11 pages.

* cited by examiner

DATA COLLECTION AND TRANSFER TECHNIQUES FOR SCANNABLE FORMS

CROSS-REFERENCE TO RELATED APPLICATIONS

This application claims priority to U.S. Provisional Application Ser. No. 61/299,507, filed on Jan. 29, 2010, the disclosure of which is incorporated by reference.

TECHNICAL FIELD

The present disclosure relates to systems and techniques for scanning, collecting and/or transferring written data, such as data collected from a scannable test form.

BACKGROUND

Scannable forms, such as forms for educational tests, patient questionnaires used at medical or dental offices, voting ballots, product surveys, consumer preference surveys, requests for services, and job applications, may be designed to allow for the automated collection of the response information using scanners. These forms can have areas for marking by a test taker, such as an area to mark, which can be read by the scanner. The areas for marking may include ovals or squares, which may correspond, for example, to multiple choice answers or true-false answers. The answers to closed-ended questions, such as multiple-choice questions, can be obtained using an optical mark recognition (OMR) system.

Details of one or more implementations are set forth in the accompanying drawings and description herein. Other features, aspects, and advantages will be apparent from the description, the drawings, and the claims.

SUMMARY

The present disclosure describes techniques and systems generally associated with data collection, data processing, data verification, and/or data transfer for scannable forms.

In one implementation, aspects of the disclosed techniques involve a scannable form that includes at least one response column parallel to a first longitudinal edge of the scannable form, and a broken ladder having locations along two substantially parallel lines for multiple rungs corresponding to encoded information that identifies a person assigned to the scannable form. A top rung is positioned on the scannable form so that the top rung is a first rung that is scanned by a test scoring machine for the broken ladder, and a bottom rung is positioned so that the bottom rung is a last rung that is scanned by the test scoring machine for the broken ladder.

These and other implementations can optionally include one or more of the following features. The encoded information can include an offset value to at least one student identification (ID) number in a class roster. A number of offset values in the broken ladder can be represented by a number of rungs between a top rung and a bottom rung in the broken ladder.

In other aspects, a scannable form includes an elongated rectangular shape with first and second substantially straight longitudinal edges, at least one response column parallel to the first longitudinal edge, and a control mark column, parallel to the first longitudinal edge and parallel to the response column but spaced therefrom. The control mark column includes, in a direction parallel to the first longitudinal edge: (1) a first set of response control marks having a first length; (2) a second set of response control marks having the first length; (3) a start-of-form mark having a second length different from the first length; and (4) an end-of-form mark having a third length different from the first length and the second length. The first set of response control marks are column aligned with the start-of-form mark and before the second set of response control marks, the start-of-form mark is column aligned before the second set of response control marks, and the second set of response control marks are column aligned before the end-of-form mark. The scannable form includes a broken ladder comprising locations along two substantially parallel lines for multiple rungs corresponding to encoded information that identifies a person assigned to the scannable form.

These and other implementations can optionally include one or more of the following features. The broken ladder can include multiple unconnected rungs, where the unconnected rungs in broken ladder can be configured to be connected with a mark in an unconnected area between the rungs. Two or more of the rungs in the broken ladder can represent a number of bits for the encoded information. One or more rungs can represent a binary number, where a value of the binary number for each of the one or more rungs can depend on whether the rung is connected or unconnected. The broken ladder can be configured to be read with a test scoring machine that reads the broken ladder and determines the encoded information from the broken ladder. The broken ladder can be positioned at a leading edge of the scannable form that is at area of the scannable form that is fed into the test scoring machine upon scanning. A top rung and a bottom rung can be connected rungs, where the top rung can define an area for the test scoring machine to recognize that scanning has commenced for the broken ladder, and the bottom rung can define an area for the test scoring machine to recognize that data for the broken ladder has been completely scanned. A top rung can be positioned on the scannable form so that the top rung is a first rung that is scanned by the test scoring machine for the broken ladder, and a bottom rung can be positioned so that the bottom rung is a last rung scanned by the test scoring machine for the broken ladder. The number of rungs between the top and bottom rungs can represent a number of bits of the encoded information. The encoded information can represent an offset number corresponding to student identification numbers in a class roster. The scannable form can include an offset area on the scannable form for printing the offset number on the scannable form.

Other aspects involve a test scoring machine configured for reading a scannable form having a broken ladder. The test scoring machine includes a graphical user interface (GUI) for receiving user data, where the broken ladder includes locations along two substantially parallel lines to have multiple rungs corresponding to encoded information that identifies a person assigned to the scannable form. The test scoring machine has a scanner bed path for receiving the scannable form, a sensor for reading the broken ladder on the scannable form and producing image data for the broken ladder, a memory unit to store information corresponding to the broken ladder, and a processor to process the image data and information from the memory unit to generate information that identifies the person assigned to the scannable form.

These and other implementations can optionally include one or more of the following features. A top rung and a bottom rung on the broken ladder can be connected rungs, wherein the top rung can define an area for the test scoring machine to recognize that scanning has commenced for the broken ladder, and where the bottom rung can define an area for the test scoring machine to recognize that data for the broken ladder has been completely scanned. The top rung can be positioned on the scannable form so that the top rung is a first rung that is scanned by the test scoring machine for the broken ladder, and the bottom rung can be positioned so that the bottom rung is a last rung scanned for the broken ladder.

Other aspects involve a method to determine correct scoring key data in a test scoring machine. The method includes accessing data for a first scoring key with the test scoring machine, and reading, with the test scoring machine, two or more scannable test forms. The method also involves scoring, with the test scoring machine, data read from the two or more scannable test forms using data from the first scoring key, and determining, with the test scoring machine, if a threshold number of scannable test forms have been read. Based upon a condition that the threshold number of scannable forms have been read, the method involves determining if the first scoring key was a correct scoring key for the two or more scannable forms.

These and other implementations can optionally include one or more of the following features. The method can include determining, with the test scoring machine, a percentage of incorrect answers for each form, and comparing, with the test scoring machine, the percentage of incorrect answers for each form with a pre-determined percentage of incorrect answers. The method can also include determining, with the test scoring machine, if a percentage of the read scannable test forms includes the percentage of incorrect answers that is greater than the pre-determined percentage of incorrect answers. If the test scoring machine determines that the percentage of the read scannable test forms includes the percentage of incorrect answers that is greater than the pre-determined percentage of incorrect answers, the method can involve presenting a message on a graphical user interface of the test scoring machine to ask a user of the test scoring machine if the first scoring key is a correct scoring key for scoring a test corresponding with the read scannable test forms. The method can involve receiving, through the graphical user interface on the test scoring machine, a user input regarding whether the user elects to enter data for a second scoring key in the test scoring machine or whether to read additional scannable test forms using the data from the first scoring key. The method can also involve accessing data for the second scoring key in the test scoring machine if the user input is received into the graphical user interface of the test scoring machine to use another scoring key. The method can include reading additional scannable test forms into the test scoring machine using the data from the first scoring key if the user input is received to read additional scannable test forms using the data from the first scoring key. The method can also include reading additional scannable test forms into the test scoring machine using the data from the first scoring key if the percentage of the read scannable test forms does not have the percentage of incorrect answers that is greater than the pre-determined percentage of incorrect answers.

Other aspects involve a method of transmitting information between a test scoring machine and a portable memory device. The method includes processing instructions to receive information from a port on the test scoring machine, where the portable memory device is coupled with the port, and the method includes processing instructions to receive selected data from a test scoring machine memory. The test scoring machine memory is configured to store the selected data, where the selected data includes any of one or more test scoring keys, class roster information, student information, and test results or statistics for one or more tests. The method includes sending the selected data from the test scoring machine memory through the port and to the portable memory device. The test scoring machine is configured to read data from scannable test forms, and the test scoring machine is a standalone apparatus.

These and other implementations can optionally include one or more of the following features. The method can include processing instructions to receive new firmware from the portable memory device and updating the firmware on the test scoring machine with the new firmware. The new firmware can enable the test scoring machine to recognize data and images for a broken ladder on a scannable test form, and the broken ladder can include locations along two substantially parallel lines to have multiple rungs corresponding to encoded information that identifies a person assigned to the scannable test form. The received information can include a scoring key, and the method further can include storing the scoring key in the test scoring machine memory. The method can involve receiving a user input on a user interface of the test scoring machine for a selection of one scoring key from a multiple scoring keys stored on the portable memory device. The method can include receiving and storing the class roster information in the test scoring machine memory. The method may involve receiving a user input on a user interface of the test scoring machine for a selection of information for one class from multiple classes in the class roster information from the portable memory device. The method can include receiving a user input on a user interface of the test scoring machine for a selection of one scoring key from multiple scoring keys in the test scoring machine memory for the selected data to send to the portable memory device. The method can involve receiving a user input on a user interface of the test scoring machine for a selection of at least one test result stored in the test scoring machine memory for the selected data to send to the portable memory device. The method can include receiving a user input on a user interface of the test scoring machine for a selection of one scoring key stored in the test scoring machine memory to score data read from scannable test forms. The test scoring machine can be detached and disconnected from another computer or a network. The portable memory device can be a universal serial bus (USB) memory stick.

Other aspects involve a scannable form that includes at least one response area to receive a response mark on the scannable form for reading by a test scoring machine, and a broken ladder including locations along two substantially parallel lines to have multiple rungs corresponding to encoded information that associates the scannable form with a unique identifier that identifies a person assigned to the scannable form.

These and other implementations can optionally include one or more of the following features. The response area can be completed by the person assigned to the scannable form. The unique identifier can be binary information associated with an identification number for the person assigned to the scannable form.

Other aspects involve a test scoring machine that includes a transport mechanism for receiving a scannable form having a broken ladder and at least one response area to receive a response mark on the scannable form, as well as an optical mechanism for reading data from the scannable form, including data from the broken ladder and the response area. The test scoring machine includes a processor for processing the data read from the scannable form, and a memory unit to store the processed data. The broken ladder includes locations along two substantially parallel lines to have multiple rungs corresponding to encoded information that associates the scannable form with a unique identifier that identifies a person assigned to the scannable form.

These and other implementations can optionally include one or more of the following features. When reading data from the broken ladder, the test scoring machine can be configured to first read a top rung of the broken ladder and last read a bottom rung of the broken ladder. Alternatively, when reading data from the broken ladder, the test scoring machine can be configured to simultaneously read data from all rungs from the broken ladder. The encoded information can include an offset value to at least one student identification (ID) number in a class roster.

Some aspects relate to scannable test form having at least one response column parallel to a first longitudinal edge of the scannable test form, and a broken ladder diagram having two substantially parallel lines separated by a first distance. The two substantially parallel lines are configured to be connected at substantially equidistance locations along the lines with one or more rungs that are perpendicular to the two parallel lines. The broken ladder diagram corresponds to encoded information that associates the scannable test form with an identifier that identifies a person assigned to the scannable form.

These and other implementations can optionally include one or more of the following features. The broken ladder diagram can be configured to have a maximum number of rungs that correspond to a number of encoded bits. The identifier can be configured to have information relating to a number of connected rungs and a number of unconnected rungs on the broken ladder diagram. The identifier can be configured to have information relating to relative locations of connected rungs and unconnected rungs on the broken ladder diagram with respect to encoded bits. The broken ladder diagram can be configured to have the rungs to be connected via a pencil mark to be read by the test scoring machine. The broken ladder diagram can be configured to have the rungs to be connected via an ink mark to be read by the test scoring machine. The scannable test form can include a top rung positioned on the scannable test form so that the top rung is a first rung that is scanned by the test scoring machine for the broken ladder, and a bottom rung is positioned so that the bottom rung is a last rung that is scanned by the test scoring machine for the broken ladder diagram. Between the top and bottom rungs, the broken ladder diagram can be configured to have the one or more rungs to connect to the parallel lines at the locations by a user of the form. Between the top and bottom rungs, the broken ladder diagram can be configured to have the one or more rungs to connect to the parallel lines at the locations by a printing device. The broken ladder diagram can be configured to have the one or more rungs to connect to the parallel lines at the locations by a user of the form or a test administrator. The broken ladder diagram can be configured to have the one or more rungs to connect to the parallel lines at the locations by a printing device. The encoded information can represent an offset number corresponding to student identification numbers in a class roster.

Details of one or more implementations are set forth in the accompanying drawings and the description herein. Other features, aspects, and advantages will be apparent from the description, the drawings, and the claims.

DESCRIPTION OF THE DRAWINGS

Like reference numbers and designations in the various drawings can indicate like elements.

DETAILED DESCRIPTION

Aspects of this disclosure relate to systems and methods for collecting response data from a form, such as data associated with a student ID number collected from a test scoring machine (TSM). Other aspects of this disclosure relate to systems and methods for verification of scanned forms, such as verifying that a correct scoring key is being used to score data from scannable test forms. Other aspects of this disclosure relate to systems and methods for transferring data to or from the TSM.

Figure 1:
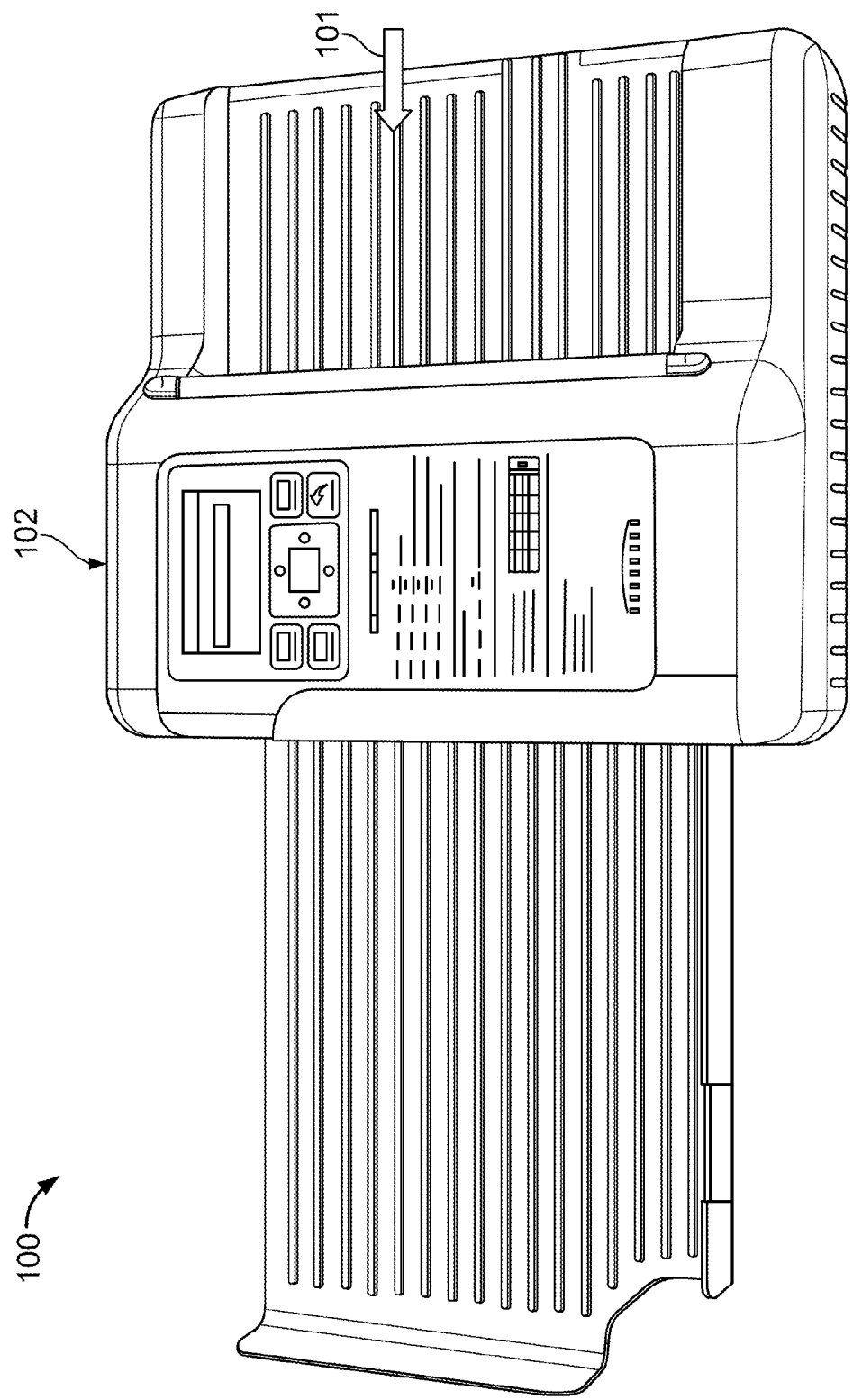
FIG. 1 illustrates a diagram of an example of a test scoring machine (TSM) that can read data from scannable forms.

FIG. 1 illustrates a diagram of an example of a test scoring machine (TSM) 100 that can read data from scannable forms. Scannable forms can be fed into an opening 101 in the TSM 100, in which the TSM 100 can read marks on the forms, and may be able to compute and generate a score from the forms. The TSM 100 can be used with a number of different types of scannable forms, such as forms from Pearson NCS, in Eagan, Minn., or Scantron Corporation of Irvine, Calif. The scannable forms may be one-sided or two-sided forms, and the TSM 100 can be configured to read one side of the scannable form per scan or both sides of the scannable form per scan. The TSM 100 has a user interface 102 so that a user of the TSM 100 may enter data and/or read data, such as class data, form data, and scoring data.

The TSM 100 also may be able to read forms for scoring keys. The forms for scoring keys can include data for the answers to scannable test forms, as well as information for the test and/or the test takers, such as a class size, a class roster, and/or student information (e.g., student ID numbers). In some implementations, the TSM 100 can upload data for the scoring keys from another source, such as scoring key data stored on a USB memory stick or from another type of memory, such as a memory from a personal computer (PC).

In some embodiments, the TSM 100 may be a standalone TSM 100, which may not be connected to a network or other networked devices. The TSM 100 can simultaneously read data from a scannable form and print features and marks on the scannable form. The TSM 100 can have one or more interfaces for outputting data, such as test scores. The TSM 100 can read written marks (e.g., bubbles, check marks, tick marks), and grayscale images. The TSM 100 can handle sheets of multiple sizes and thickness in a single batch, from small card stock to long printouts.

In some uses of TSM, the individual correctness or incorrectness of each answer, the generated score, and an item analysis of the performance of one or more of a group of tests can be printed by the TSM 100 on the scannable form, or in the case of items analysis, on a special form designed for this purpose. To enter data in a grade book or in grading software on a personal computer (e.g., grade book software), the information from the TSM 100 can be printed on a form, and may be manually entered into the desired destination (e.g., the grade book or the grading software on the PC) in some implementations. The item analysis information, which can indicate the effectiveness and appropriateness of the test being given, may not be manually copied to the desired destination in some implementations. In some implementations, the data for the grade book or grade books software can be copied from the TSM to a portable memory device, such as the USB memory stick, for insertion into a PC.

When computing and gathering information about student performance from the TSM, each test form can be associated with a specific student who took the test. Some methods to associate a particular student to a specific test include methods utilizing a bubble in an OMR grid. The bubbles in the OMR grid may have a teacher or student to properly fill in the OMR bubbles on the form. To prevent errors in recording data when manually copying the data to a desired destination, care should be taken by the teacher, student, or test provider to avoid potential errors, such as marking the wrong bubble, not filling in the bubble sufficiently, or filling in multiple bubbles by mistake.

The scannable forms can have an arrangement of text and graphics that can define response queries and response fields. Other features on the form layout can include instructions and information identifying the form. The scannable forms can include location marks, and can be shaped in a rectangular paper sheet, though other shapes, surfaces, and materials are possible in alternative implementations, such as cardboard, wood, plastic, etc. The location marks can provide a clear, scannable feature that the TSM can use to identify a referenceable physical location on the surface. In some implementations, the location marks can also be referred to as a timing track, and can be a row of uniformly spaced timing marks located along one edge of the sheet. Other types of location marks can be used instead of timing marks. In some implementations, timing marks can be located within one-half inch of the edge of the sheet of paper.

In some implementations, the form can include a bar code area, where one or more bar codes identifying the form may be placed. In some implementations, there are areas for customized questions or queries, the corresponding response areas, as well as text areas and graphics. Text box response areas can be rectangular, where one letter can be written by the user, facilitating optical character recognition from this area. An open-ended response area can allow a user to add text to another area. A multiple-choice response area can allow a user of the form to select from pre-defined choices, either by placing a mark in a box, shading an oval, or by making other indications.

Scannable Forms with a Broken Ladder

Figure 2:
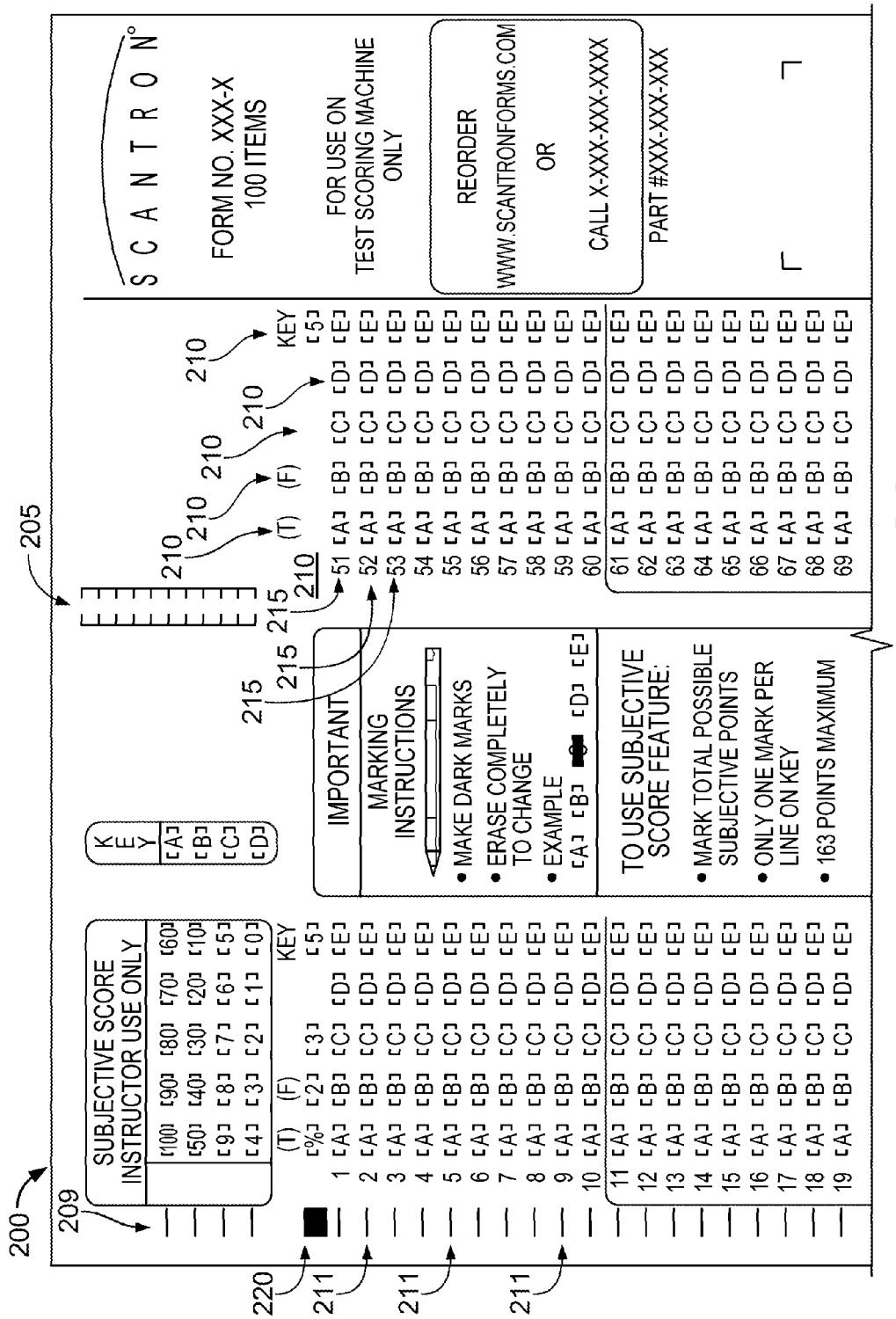
FIGS. 2-4 are drawings with examples of forms having a broken ladder printed on each of the forms.
Figure 2:
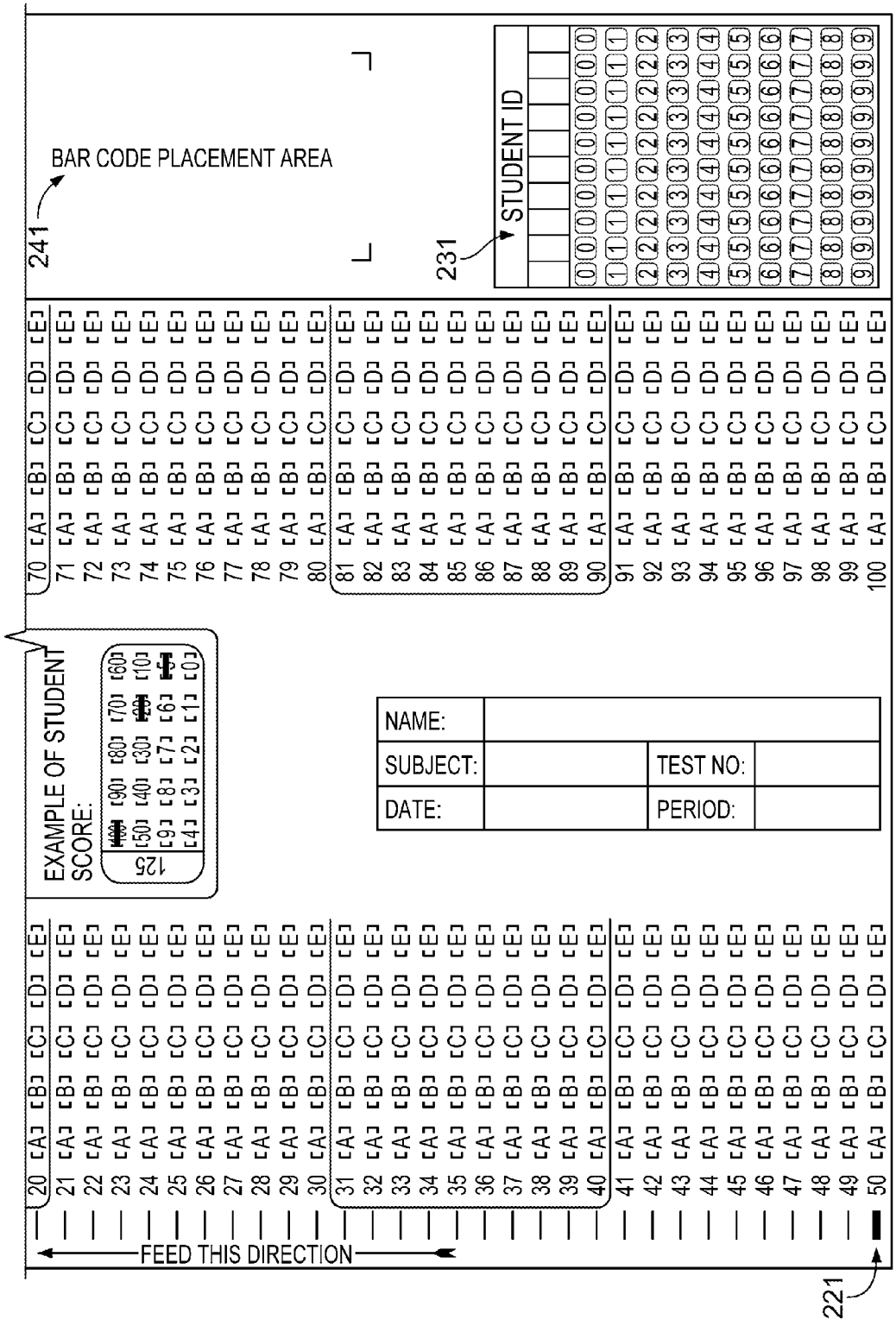
Figure 3:
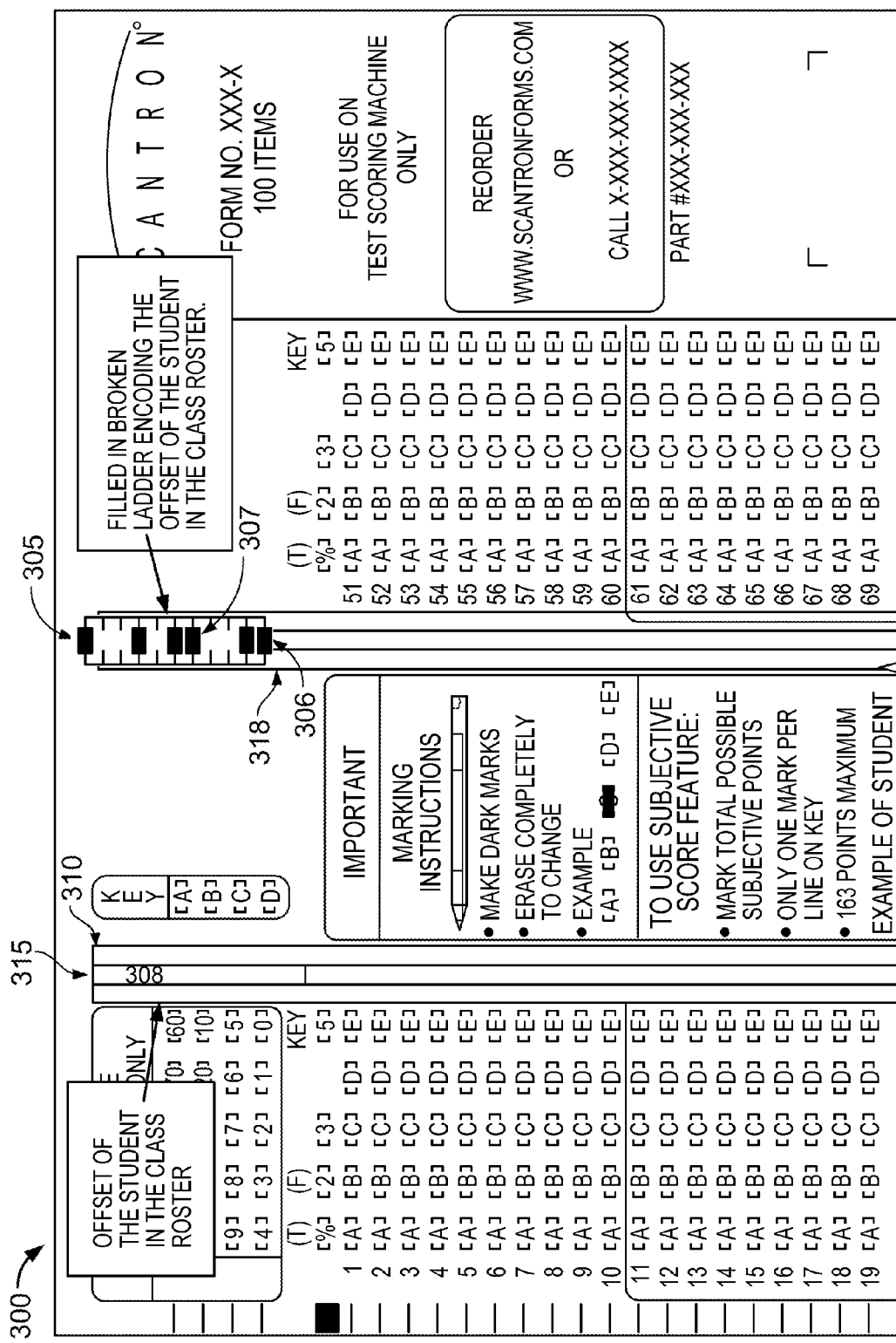
Figure 4:
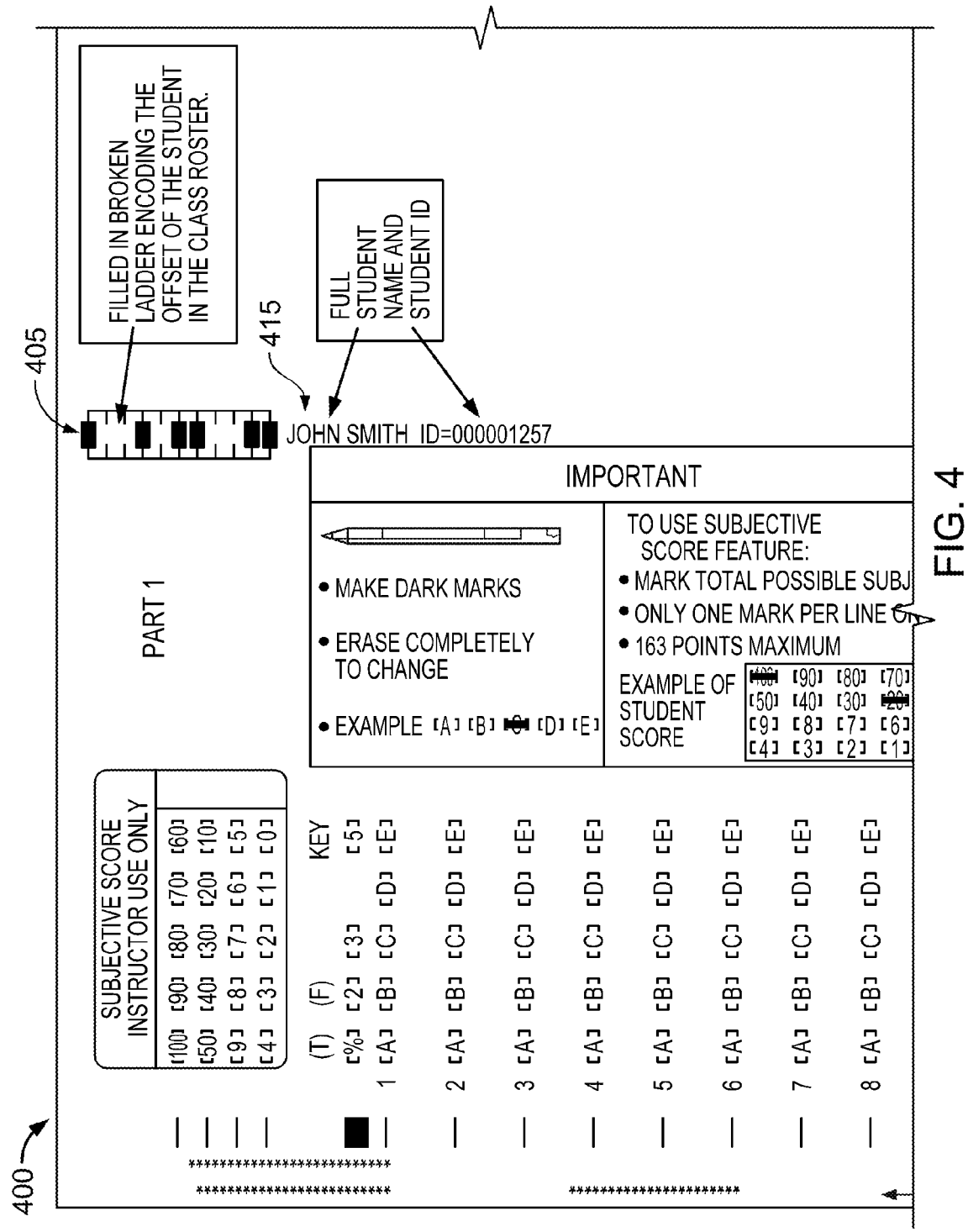

FIGS. 2-4 are drawings with examples of forms having a broken ladder printed on each of the forms. FIG. 2 shows a scannable form having an elongated rectangular shape with substantially straight longitudinal edges, and response columns 210 parallel to a longitudinal edge of the form. The form 200 has a control mark column 209 that is parallel to the longitudinal edge and parallel to at least one of the response columns but spaced apart from the response column. The control mark column 209 has, in a direction parallel to the longitudinal edge: response control marks 211, a start-of-form mark 220, and an end-of-form mark 221, in which the response control marks 221 are column aligned with the start-of-form mark 220 and the end-of-form mark 221. The form has a response row 215 corresponding to each response control mark 211, where each response row is row aligned with the corresponding response control mark and perpendicular to the longitudinal edge. Each response row includes at least two response receiving spaces, and each response receiving space is aligned in one of the response columns 210.

In some implementations, detection of the start-of-form mark 220 by the TSM can initiate scanning of response data from the response rows 215 corresponding to the response control marks 211. The end-of-form mark 221, the last mark in the control mark column 209, can enable score or tally printout, or may trigger data storage or transmission. Both the start-of-form mark 220 and the end-to-form mark 221 also can act as response control marks. The present disclosure is not limited to use with forms having a start-of-form mark 220 and/or an end-of-form mark 221, or having the format as shown in FIG. 2. The scannable form can have other areas for data entry, including zones for printing a bar code 241, optical character recognition (OCR) spaces, and/or intelligence character recognition (ICR) spaces, where the zones may be selectively positioned to avoid interfering with handwritten marks in the rows of response receiving spaces and provide a sufficient margin of error for printing, paper placement, etc.

The scannable form 200 of FIG. 2 can be used to associate test results scanned on the TSM by printing blocks on a preprinted frame called a "broken ladder" 205. This printing may be accomplished using the TSM's printing capability or a user's laser printer, in which the laser printing can be assisted by a software package for printing the broken ladder 205 on the form 200. The form 200 can have, for example, 100 rows printed on one or both sides of the form 200.

In some implementations, the broken ladder 205 on the form 200 can be used in a method of encoding the student identification without a requirement of having to manually entering the student identification data in a grade book or grading software on a PC. The information on the broken ladder 205 can be encoded by connecting (for a "one") the broken rungs of the broken ladder 205 with a printed block character or not connecting (for a "zero") the broken rungs. These "ones" and "zeroes" can be interpreted as a binary code for indicating the position of a student in a roster of students, which then can be downloaded to the TSM prior to printing on the TSM and/or scanning of the test forms.

The scannable form 200 has an area for a test taker to enter a student identification (ID) number in a student ID area 231. By also having the broken ladder 205 printed on the form 200, the test provider (e.g., teacher or test proctor) may be able to provide student ID information that may not fit within or be suitable for the format of the student ID area 231 on the form 200. For example, the student ID numbers for a school may have a different number of digits from the number of digits available on the student ID area 231 of the form 200, and the school may not be able to use the student ID area 231 of the form 200 to identify students who take their tests. The test provider can use encoded student ID data derived from the broken ladder 205 to correlate the format of particular student ID numbers for a school/organization with a class roster and/or a number of students taking a particular test.

In some implementations, the TSM may be preconfigured to read a broken ladder on the form, and process the broken ladder data that was read. In other implementations, the TSM can be configured with a firmware upgrade that enables the TSM to detect the broken ladder on the form, and process data from the broken ladder.

In some implementations, the accuracy of the printing process on the broken ladder can be further enhanced by always connecting the top and bottom rungs of the ladder (e.g., as in FIGS. 3 and 4). This can provide both scanner-readable and human-verifiable evidence of correct printing. The data from the broken ladder 205 can then be used to associate the results from the test form with the student on the class roster.

Although the broken ladder 205 is shown in a vertical position on the form, the broken ladder 205 may be placed in a horizontal position on the form in some implementations. Also, the top and bottom rungs of the broken ladder 205 in the vertical position may correspond to left and right (or right and left) rungs in the horizontal position. In some implementations, the broken ladder may be placed at any available location on the form, and not only the leading edge of the form where it is first read into the TSM. In some implementations, when reading data from the broken ladder, the test scoring machine can be configured to first read a top rung of the broken ladder and last read a bottom rung of the broken ladder. Some of these implementations may be, for example, in situations where the broken ladder is positioned vertically on the form. In other implementations, when reading data from the broken ladder, the test scoring machine can be configured to simultaneously read data from all rungs from the broken ladder. Some of these implementations may be, for example, in situations where the broken ladder is positioned horizontally on the form.

FIG. 3 is a drawing with an example of a view of a form 300 having a broken ladder printed on the form 300. The form 300 in FIG. 3 can resemble the form 200 in FIG. 2. The form 300 in FIG. 3 shows a broken ladder area 318 for the broken ladder 305. When the broken ladder 305 is formed on the form, the broken ladder area 318 is an open space on the form 300 that can be used as an indicator of where the broken ladder 305s should be printed. In FIG. 3, the broken ladder area 318 is shown as solid vertical lines.

The broken ladder 305 has one or more connected rungs, where each connected rung 306 is printed with a block character to represent a binary one, as well as one or more open rungs, where each open rung 307 represents a binary zero. In some implementations, the filled-in broken ladder can encode an offset of a student in a class roster. The form 300 has an offset area 310 so that a numerical value of the offset 315 of the student (e.g., offset number "308") may be printed within the offset area 310. The broken ladder 305 is located at an upper area of the form 300 that is the leading area where the form 300 will first be inserted into and scanned by the TSM.

FIG. 4 is a drawing with an example of a view of a form 400 having a broken ladder 405 printed on the form 400. The form 400 can have 50 rows to represent a 50-question form, in which the form 400 in FIG. 4 is more narrow than the forms of FIGS. 2 and 3. The form 400 has available printing space on the right side of the form 400 for the broken ladder 405 and student identification information 415 (e.g., "John Smith ID=000001257"). The broken ladder 405 is located at an upper area of the form 400 that is the leading area where the form 400 will first be inserted into and scanned by the TSM.

Figure 5:
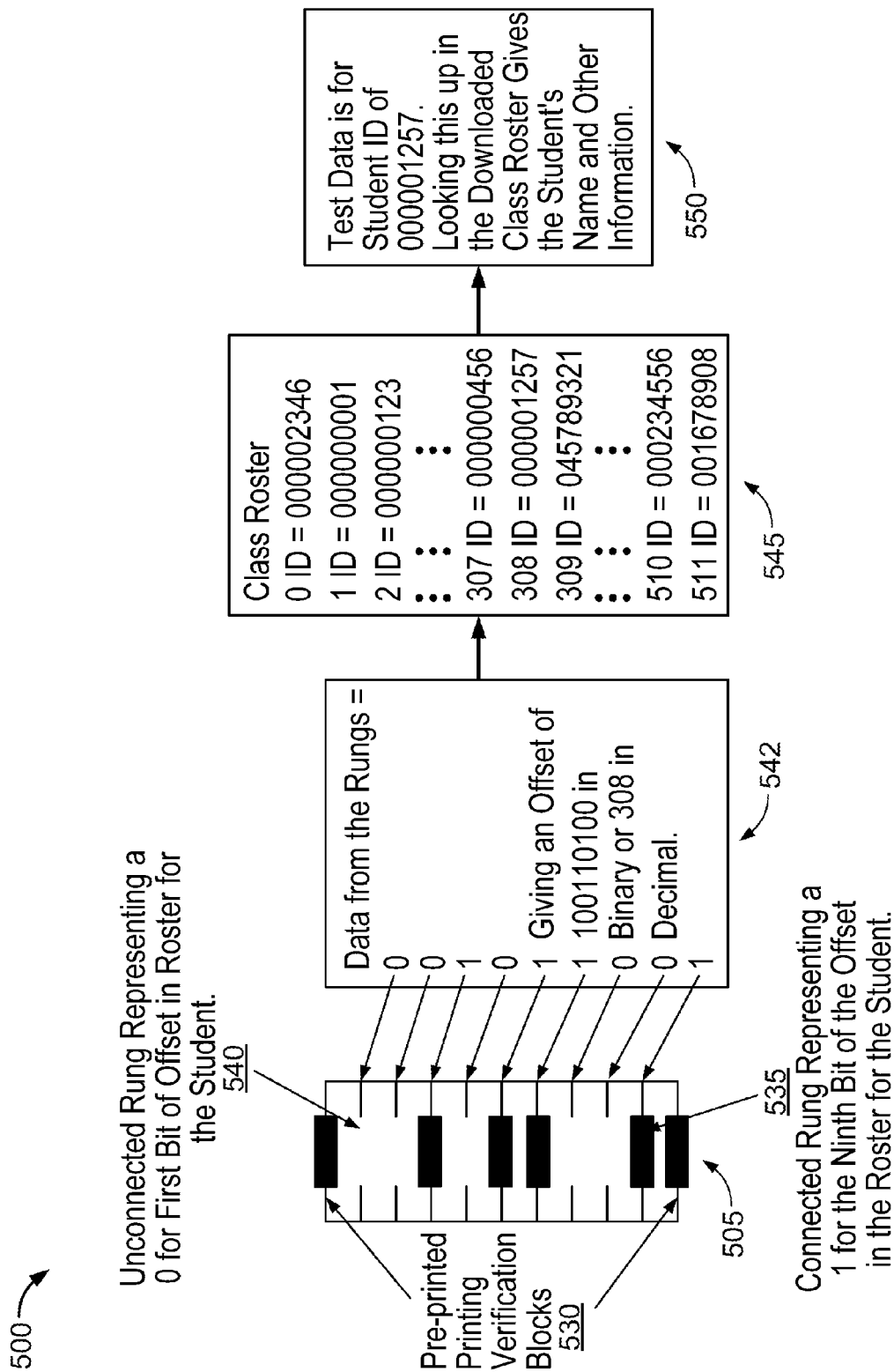
FIG. 5 is a drawing with an example for identifying a student identification (ID) number using the broken ladder on a scannable form.

FIG. 5 is a drawing 500 with an example for identifying a student identification (ID) number using the broken ladder 505 on a scannable form. The total number of rungs in the example for the broken ladder 505 is 11 rungs, with the connected top and bottom rungs being used as start and ending marks for broken ladder 505 when scanning the broken ladder on the scannable form with the TSM. For example, the broken ladder 505 can have pre-printed printing verification blocks 530 to indicate the start and end connecting marks in the top and bottom rungs for printing other connecting marks within the broken ladder 505. The number of rungs can determine the number students that can be encoded, for example, as 2 to the power of the number of data rungs (e.g., $2^{(number\ of\ data\ rungs)}$). In the example of FIG. 5, a total of 512 students or $2^9$ students can be encoded. Some implementations may have a larger or a smaller number of students than 512 students.

These implementations may depend on the size of the class roster and the available space for printing the broken ladder 505 on the form. Although the top and bottom connected rungs are indicated as pre-printed rungs in FIG. 5, other implementations may vary and may not have these rungs connected as in the example of FIG. 5. For example, when the top and bottom data rungs are pre-printed, the number of rungs that can determine the number students that can be encoded, can be 2 to the power of the number of data rungs (e.g., $2^{(number\ of\ data\ rungs-2)}$).

In some implementations, the student ID number can have a larger or smaller number of digits than what may be available in the student ID area 231, so an offset can be used with the class roster to generate a student ID number that can fit the format or number of student ID digits for a school, class, or testing entity, or could otherwise be encoded with such a student ID number. The size and spacing between the rungs can vary based on the needs of the printing and reading of the TSM. For example, the connected rung 535 can represent a binary one for the ninth bit of the offset in the class roster for the student. The unconnected rung 540 can represent a "zero" for the first bit of the offset in the class roster for the student.

The data 308 from the rungs may be binary data 542. For example, if the binary data 542 is 001011001, as shown in FIG. 5, then the offset can be 100110100 in binary or 308 in decimal (base 10). When looking at the class roster 545, decimal number 308 corresponds to Student ID Number 000001257, which has nine digits in the student ID number. Because the student ID number was identified, the test data from the form can be determined to belong to the student with the Student ID Number 000001257. A downloaded class roster can be accessed to provide the corresponding student's name and other information 550.

In some implementations using the forms 200, 300 of FIGS. 2 and 3, the first printing column in the offset area 310 can be used to output just the offset (e.g., offset "308") in the class roster that is represented by the broken ladder data. Some TSM implementations may have the correct answers or error marks printed in the same column because there can be only a few areas (e.g., two areas) on the form to define an available space for printing (on) the broken ladder. In some implementations using the form 400 of FIG. 4, the second printing column may be available, and the full student name and student ID number may be printed in that column.

The broken ladder 505 and/or the marks to connect the rungs may be printed using the TSM or by using a printer (e.g., a laser printer) that utilizes a software program for adding and/or interpreting the broken ladder and its results. In some implementations, if the broken ladder and/or the marks to connect the rungs are printed in the TSM then the TSM can print similar to ink jet printers. In some implementations, the TSM may have two printing mechanisms on the TSM that can mark the form to indicate if an answer is correct or incorrect. The printing mechanisms may be in the paper path of the TSM, so the data can be scanned from the form and data can be printed on the form simultaneously. The broken ladder can be added to existing scannable forms, or the forms can be manufactured with the broken ladder pre-printed on them.

The broken ladder can be used to associate a form and/or form data to a unique identifier, in which the unique identifier may be associated with a person (e.g., a person who completes the form). For instance, although the broken ladder is described in some of the examples herein to identify a student (or a student ID), the broken ladder may be used in other situations as well to identify a person associated with the form, form data, a test and/or a survey. For example, the person may be an employee with an employee ID number or code, a medical patient with a patient ID number or code, a survey participant with a participant ID number or code, a game participant with a player ID number or code, a job applicant with a job applicant ID number or code, a voter with a voter ID number or code, and so on.

Figure 6:
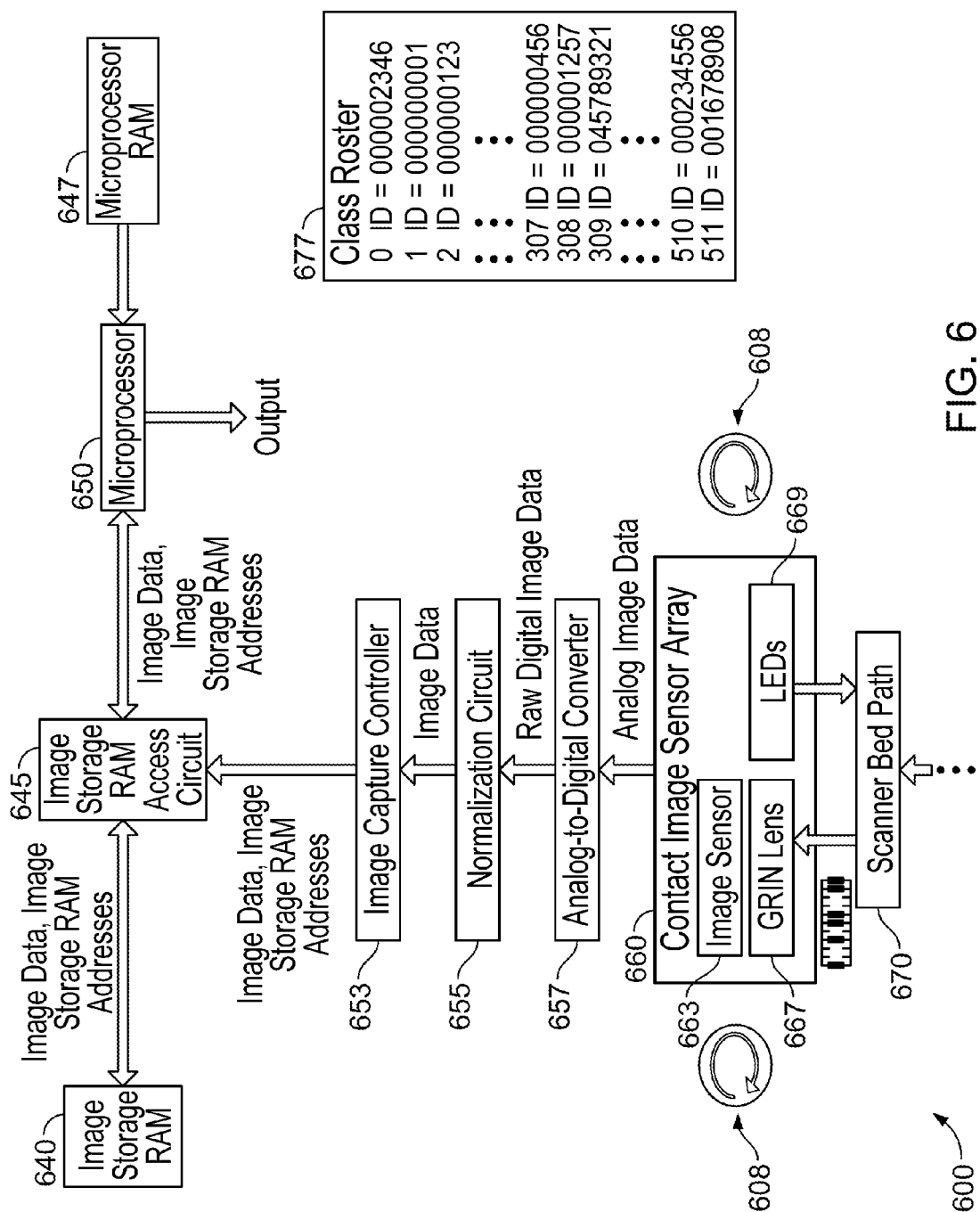
FIG. 6 shows a flow diagram with an example for the data flow in the TSM when scanning a form with the broken ladder.
Figure 6:
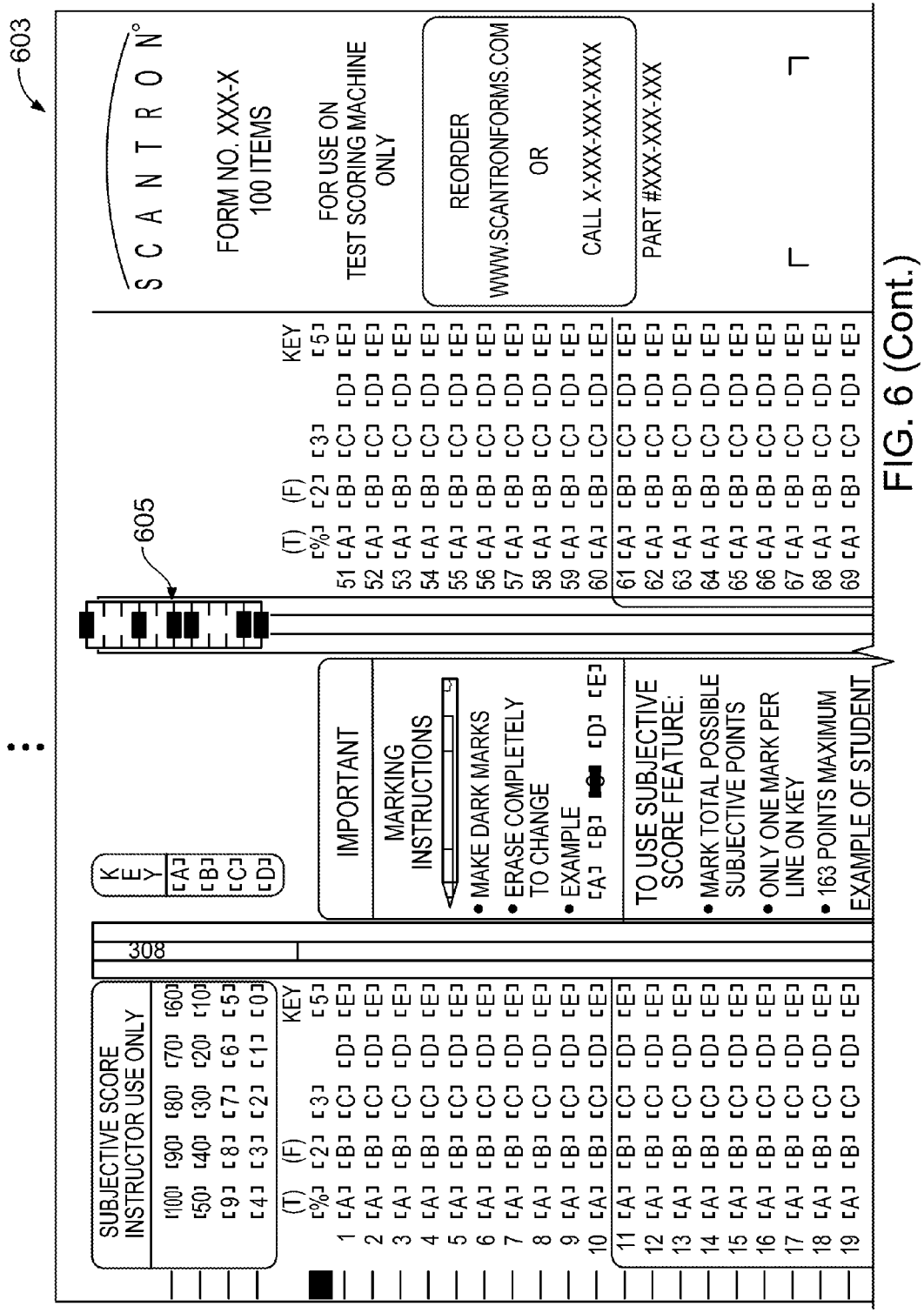

FIG. 6 shows a flow diagram with an example for the data flow in the TSM 600 when scanning a form with the broken ladder. The example of the TSM 600 includes a scanner bed path 670, and a contact image sensor (CIS) array 660, which includes an image sensor 663, a graduated index of refraction (GRIN) lens 667, and light emitting diodes (LEDs) 669. The TSM 600 also includes an analog-to-digital converter (ADC) 657, a normalization circuit 655, an image capture controller 653, an image storage random access memory (RAM) 640, an image storage RAM access circuit 645, a microprocessor 650, and a microprocessor RAM 647. The TSM 600 also can have class roster information 677 with student ID numbers in one or more of the memory units of the TSM.

In an example operation, a scannable form 603 having the broken ladder 605 and/or the student data is fed along the fixed scanner bed path 670 using rotating rubber drive wheels 608. The LEDs 669 in the CIS array 660 illuminates the form 603 as it moves along the transport of the TSM 600. The image sensor 663 in the CIS array 660 captures analog pixel data in scan lines from the image of the form 603 that is focused upon by the CIS array's GRIN lens 667. The analog pixel data capture is synchronized with the movement of the paper to allow for the creation of a dimensionally-correct (e.g., 2-dimensional image) of the broken ladder. The analog image data is digitized using the ADC 657 to convert the analog voltage levels from the CIS array's image sensor 663 to represent each pixel's grayscale level in digital image data. The digital image data can then be adjusted (e.g., normalized) in the normalization circuit 655 by applying an offset and gain to each pixel to compensate for variances in the illumination of the LEDs 669 for the and sensitivity of the image sensor 663 in the CIS array 660. A true grayscale image of the broken ladder can be produced. Each scan line then can be captured by the image capture controller 653 into an image storage RAM 640 via the image storage RAM access circuit 645. The image capture controller 653 can assemble the two-dimensional image of the broken ladder by controlling the image storage RAM addresses that are used to sequentially capture each scan line.

The storage of each sequential line of data into the image storage RAM 640 can be controlled by the image storage RAM access circuit 645, which can manage the capture of the image data during scanning, and access the microprocessor 650 during the analysis of the broken ladder data. The microprocessor 650 in the TSM 600 can detect the pertinent pixels from the two-dimensional image of the broken ladder by providing the correct image storage RAM address and reading back the image pixel data on a per pixel basis. The microprocessor 650 in the TSM 600 can access the microprocessor RAM 647 to obtain the class roster information 677, which can be arranged such that the value from the broken ladder can be used to obtain an offset of the student information for the students taking the test.

The microprocessor 650 can determine which rungs of the broken ladder are connected and which rungs are unconnected. The microprocessor 650 can then convert the connected rungs to binary ones and the unconnected rungs to binary zeros to create a multi-bit binary number. This multi-bit binary number can then be used as an offset in the class roster information 677 in the microprocessor RAM 647 to access the desired student information for the student taking the test. The offset, the class roster information 677, and/or the student ID can be sent to an output terminal of the microprocessor 650. In some implementations, the order of the components in the TSM 600 can vary from what is shown in FIG. 6.

Detecting an Incorrect Scoring Key When Scoring Scannable Forms.

When scannable forms for a test are scanned by the TSM, the answers on the form can be compared against data from a scoring key, in which the scoring key includes the correct answers to the test questions. The correct answers for scoring the test form can be downloaded to the TSM or scanned from a form specifically marked to be the answer/scoring key for scoring the test.

Because the scoring key is input to the TSM, a possibility exists that an incorrect scoring key will be entered. For example, a teacher would have to notice a large number of wrongs answers on the forms after scoring a number of forms. Alternatively, in the case of some implementations where the TSM makes a noise or an alert sound when printing the error marks or the correct answers on wrong questions, the teacher would listen for the amount of printing on the scannable forms to detect for a large amount of wrong answers. If an incorrect scoring key was entered, then the scannable forms would have to be re-scanned with the correct scoring key. Also, for the case of a TSM making noise to indicate wrong answers, a noisy printer may not be suitable in some testing environments.

Most students in a given test will usually answer correctly to a minimum amount of test questions. Using this principle, the TSM can determine after scanning and scoring a certain number of forms whether most or all of the forms scanned had more than a certain percentage (e.g., a threshold percentage) of the questions wrong. If after the threshold percentage of wrong answers has been exceeded for most or all of the forms scanned, a message may appear on the TSM asking if the correct scoring key had been scanned or selected (e.g., if the scoring key was downloaded). The person scanning the forms can then check the scoring key, and if the scoring key is correct, can have the option of continuing the scan. If the scoring key is found to be incorrect when checked by the person scanning the forms, that person can be given the options of rescanning, reselecting, downloading from a network connection, or uploading (e.g., upload from memory) the correct key into the TSM 100. The following flow chart can illustrate an example of this error-checking technique.

Figure 7:
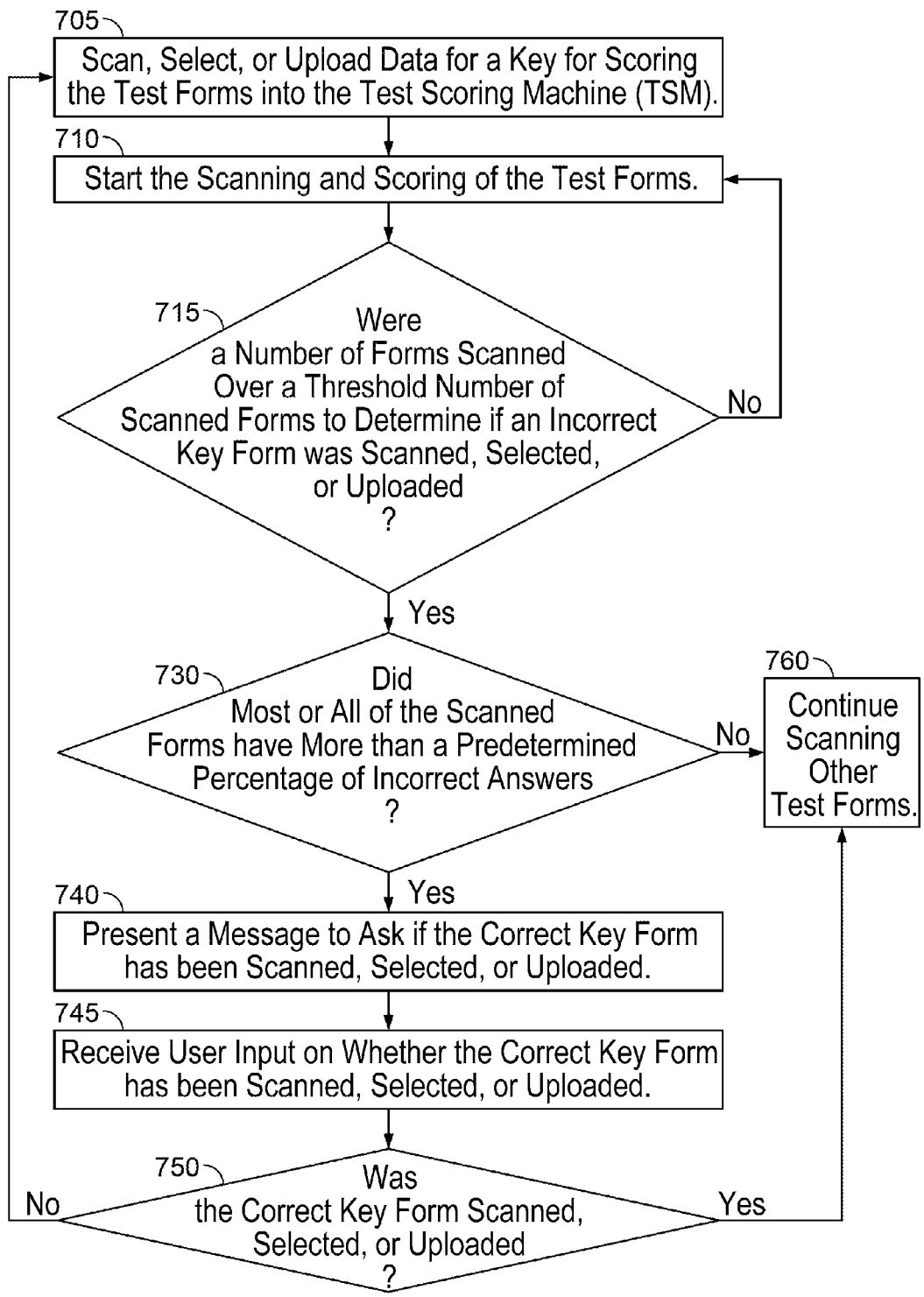
FIG. 7 shows a flowchart with an example for collecting responses and detecting an incorrect scoring key for the scannable forms.

FIG. 7 shows a flowchart with an example for collecting responses and detecting an incorrect scoring key for the scannable forms. Before a scannable form is scanned for scoring, the key for scoring the test form is entered into the TSM by scanning a scoring key form, selecting data for a scoring key form on the TSM, downloading data for the scoring key (e.g., by a computer connection), or uploading the data from memory, such as a universal serial bus (USB) memory (705). The test forms can then be scanned and scored (710).

A determination by the TSM can be made to see if a number of forms scanned over a threshold number of scanned forms to determine if an incorrect key was scanned, selected, uploaded, or downloaded (715). If not, then additional test forms can be scanned and scored (710). If a number of test forms scanned was over a threshold number of scanned test forms, then a determination can be made by the TSM as to whether most or all of the scanned test forms have more than a predetermined percentage of incorrect answers (730). If most or all of the scanned test forms did not have a more than a predetermined percentage of incorrect answers then the TSM can display a message to the user that the scoring key form appears to be correct and for the user to continue scanning other test forms for scoring (760). If most or all of the scanned test forms did have a more than a predetermined percentage of incorrect answers then the TSM can display a message to the user that the scoring key form appears to be incorrect, and the TSM can present a message to ask the user whether the correct scoring key had been entered into the TSM (740). In some implementations, the TSM may display a message to the user about the correctness of the forms when the scoring key appears to be incorrect, and when the scoring key appears to be correct, does not stop reading or scoring the forms and/or does not display a message to the user about the correctness of the forms.

The TSM can receive user input (e.g., from the user interface 102) on whether the correct scoring key had been entered into the TSM (745). If the correct scoring key was entered into the TSM (750), then the TSM can display a message to the user for the user to continue scanning other test forms for scoring (760). If the correct scoring key was not entered into the TSM (750), then the TSM asks the user to enter the correct scoring key, such as by scanning another scoring key form, selecting data for another scoring key form on the TSM, downloading data for another scoring key, or uploading the data from an external memory (705).

The TSM may also present a help file or a help menu to the user for entering the correct scoring key. For example, the help file may allow the user to troubleshoot a problem, find answers on how to enter scoring key data or test forms, and/or determine if an incorrect scoring key was used. In some implementations, the TSM may be a standalone TSM, which may not be connected to a network or another computer.

In some implementations, when the correct scoring key was not initially entered (750) and the correct scoring key was subsequently entered into the TSM (705), then new test forms can be scanned and scored without rescanning the previously-scanned test forms. The previously-scanned test forms can have their answers and test data saved within a memory unit of the TSM, and the TSM can re-score the answers and test data without requiring that the test forms be re-scanned into the TSM. In this manner, scoring errors that occur as a result of initially having an incorrect scoring key in the TSM can be quickly corrected by entering the data for the correct scoring key in the TSM.

In one example of the techniques in FIG. 7, a teacher can scan a scoring key and then scan a number of competed scannable test forms from students. When the teacher receives the completed forms from the students, the teacher may make an error and get the test forms mixed up or scan the scoring key form incorrectly. When scanning and scoring the competed forms, the TSM can send a warning or notification to the teacher to ask the teacher if they had initially entered a correct scoring key for the test with the correct answers. The TSM can give the teacher a checkpoint in the scoring forms for the teacher to check and validate if they are scanning the correct scoring key. The teacher can continue with the same scoring key or restart the process with the correct scoring key. If the teacher has to restart with the correct scoring key, then the teacher can enter the scoring key into the TSM so that the scoring key information can be updated in the TSM. Because the data from previously-scanned test forms from some students are already in the memory of the TSM, the TSM can re-calculate the scores from those tests, and the teacher does not have to re-scan all of the previously-entered test forms into the TSM.

The TSM can notify the person doing the scanning of the test forms whether the scoring key is correct so that the correct scoring key can be entered into the TSM before most or all of the test forms are scanned. The correction can be made in real time. Even if all of the test forms are scanned, the TSM holds data for all of the scanned test forms in the memory of the TSM and can re-score all of the test data if data for a correct scoring key was entered into the TSM after all of the test forms were scanned.

The threshold number for the number of forms after which to make this error checking, and/or the percentage of incorrect answers can either be fixed or set by a user. In one example, the threshold number of forms scanned for incorrect scoring key detection can be set to three, and the percentage of incorrect answers can be set to 45%. In this example, an incorrect scoring key is scanned into the TSM, three forms are scanned, and the TSM detects the percentage of incorrect answers on each of the three forms as 55%, 58%, and 79%, respectively, thus exceeding the failure percentage of 45%. The TSM can then display a message to the person scanning the forms that they should check the scoring key. The TSM can provide an option for the user to continue scanning additional test forms or to enter in data for another scoring key (e.g., by scanning a scoring key form, selecting data for another scoring key on the TSM, downloading the scoring key data from another source (e.g., a website), or uploading the scoring key data from an external memory source). If the scoring key is determined by the person using the TSM to be incorrect, then the person using the TSM can select the option to scan another scoring key. Upon receipt of a user selection, the TSM can scan another scoring key. In the event that the TSM does not save the data from the previously-scanned test forms, then the process can start over and those test forms can be rescanned for scoring. If the TSM does save the data from the previously-scanned test forms, then the data from those forms are re-scored, and the TSM can scan additional test forms for scoring with the updated scoring key.

In another example, the threshold number of forms scanned for incorrect scoring key detection can be set to four, and the percentage of incorrect answers can be set to 30%. Data for one or more scoring keys can be downloaded on the TSM, and a user can select one of the scoring keys on the user interface of the TSM for the correct answers to a test. Then, four test forms can be scanned, and the TSM can detect the percentage incorrect answers on each of the four forms as 35%, 48%, 32%, and 39%, respectively, which exceed the failure percentage of 30%. The TSM can then display a message to the person scanning the forms that they should check the scoring key for correctness. The TSM can provide an option for the user to continue scanning additional test forms or to enter in data for another scoring key (e.g., by scanning a scoring key form, selecting data for another scoring key on the TSM, downloading the scoring key data from another source, or uploading the scoring key data from an external memory source). In this example, the person scanning the form can determine that the scoring key is correct, and can select the option to continue scanning other forms into the TSM. Upon receipt of a user selection, the TSM can scan and score the test forms without checking for an incorrect scoring key.

Techniques for Data Transfer with the Test Scoring Machine

Various techniques are described for sending information between a PC to the TSM without having a connection (e.g., wired or wireless connection) between the PC and the TSM. In these implementations, the TSM can be a standalone TSM that is not connected to the PC or networked with the PC. These implementations can involve having a group of test takers on PCs each saving their test data on a portable memory device (e.g., a USB memory stick), and the test provider can obtain the portable memory devices from the test takers and insert their respective test data on the portable memory devices into the TSM via a USB interface on the TSM. The data on the portable memory device can be secured, in which it can be encrypted with an encryption key that is known to the test taker and/or the test provider.

Figure 8:
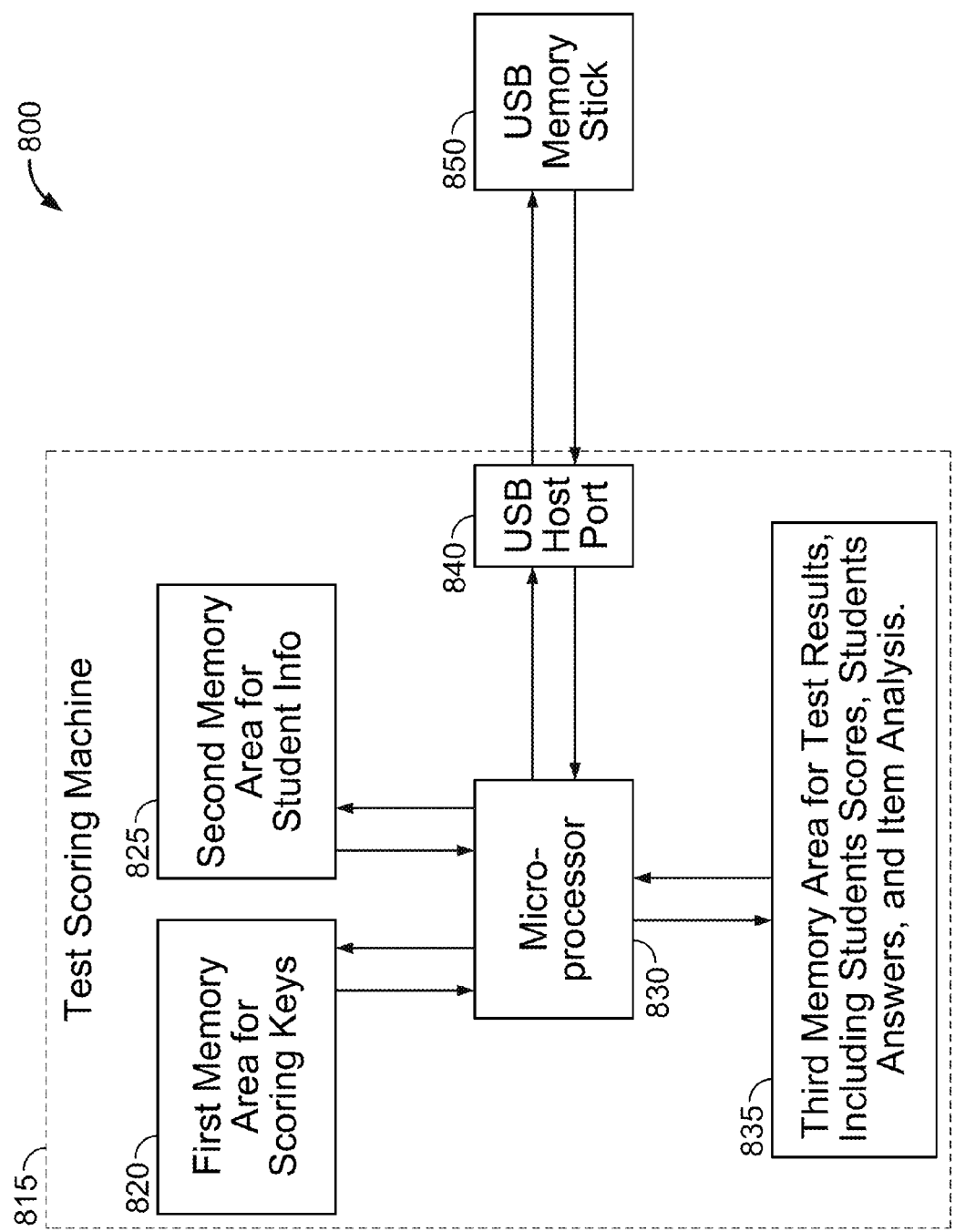
FIG. 8 shows an example of a system for transferring scanned data, including the TSM and a Universal Serial Bus (USB) memory stick.

FIG. 8 shows an example of a system 800 for transferring scanned data, in which the system includes a TSM 815 and a USB memory stick 850. The TSM 815 includes a first memory area 820 to store the scoring keys, a second memory area 825 with student information (e.g., student IDs), a microprocessor 830, a USB host port 840, and a third memory area 835 having test results, including student scores, answers, and item analysis. The microprocessor 830 can process data and interact with any of the memory areas 820, 825, 835 and the USB host port 840 for data storage and transfer within the TSM 815. Any combination and/or number of memory areas in the TSM 815 can store the test data in any combination.

In some implementations, the data for the scoring key can be obtained by the TSM 815 by scanning a scoring key form into the TSM 815. The student information and answers to the test also can be obtained by inserting the USB memory stick 850 into the TSM 815, where the USB memory stick 850 stores the student information and data for corresponding test answers. Some student information may also be obtained by the TSM 815 using the broken ladder, as described above. In some implementations, the scoring keys can be obtained by the TSM 815 as in one of the techniques described above (e.g., uploading from an external memory source), and the student data from the test can be entered into the TSM 815 via inserting the USB memory stick 850 into the USB host port 840.

In some implementations of the system 800, the scoring key can be obtained by the TSM 815 via the USB memory stick 850, and the test forms from the students can be scanned into the TSM 815 to obtain student information and their answers to the test questions. In some implementations, the TSM 815 may have data for a number of previously-entered scoring keys stored in a memory (e.g., first memory area 820) of the TSM 815, and the user of the TSM 815 can select one of those scoring keys for scoring a particular test. In other implementations, the USB memory stick 850 also can be configured to store data for the broken ladder on test forms, such as being configured to store offset information for the student ID numbers.

In some implementations of the system 800, the test data from the USB memory stick 850 can be scored with the TSM 815 and entered into or exported into a digital grade book or grading spreadsheet via grading software. The TSM 815 also can perform item analysis on the test data to generate various test data metrics from the test, such as the percentage of students that incorrectly answered a particular question on the test. Alternatively, the TSM 815 may score the test, the test data can be transported from the TSM 815 to the USB memory stick 850, and then to a PC (not shown) for analysis. The PC may have software for the digital grading book, as well as software to perform test analysis.

In addition to having encryption of the data on the USB memory stick 850, other security features can include having the scoring keys and test data to be stored on the TSM 815 instead of a PC. The TSM 815 also can be configured to generate a paper copy of the test scores, and any analysis of the test, so that a paper copy of this information can exist in addition to the stored data for these items.

In some implementations, the TSM 815 can have firmware (not shown) to take the scoring data from the third memory area 835 of the TSM to place it on the USB memory stick 850, so that this data can be read and processed by a software package on the PC. In some of implementations, raw scoring data can be placed on the USB memory stick 850 to be sent to the PC, in which the raw scoring data may include scoring data that is not analyzed by the TSM 815. Software on the PC and/or software on the TSM can perform a digital re-score of a test by using a different scoring key for a set of test answers from students. The results of the digital re-score can be exported into the digital grade book.

Other types of portable memory devices may be used instead of (or in addition to) USB memory sticks (e.g., flash memory cards), and other types of host connection interfaces (e.g., flash memory card interfaces, IEEE 1394 interface, FireWire) on the TSM 815 may be used instead (or in addition to) the USB host port 840. In some implementations, the USB memory stick 850 may be formatted with software to only store data associated with the test taking process, so that the USB memory stick 850 is solely dedicated for test taking purposes. In some implementations, the memory areas 820, 825, 835 may be part of a single memory unit in the TSM 815, and in other implementations, the memory areas 820, 825, 835 may be part of two or more separate memory units in the TSM 815.

Figure 9:
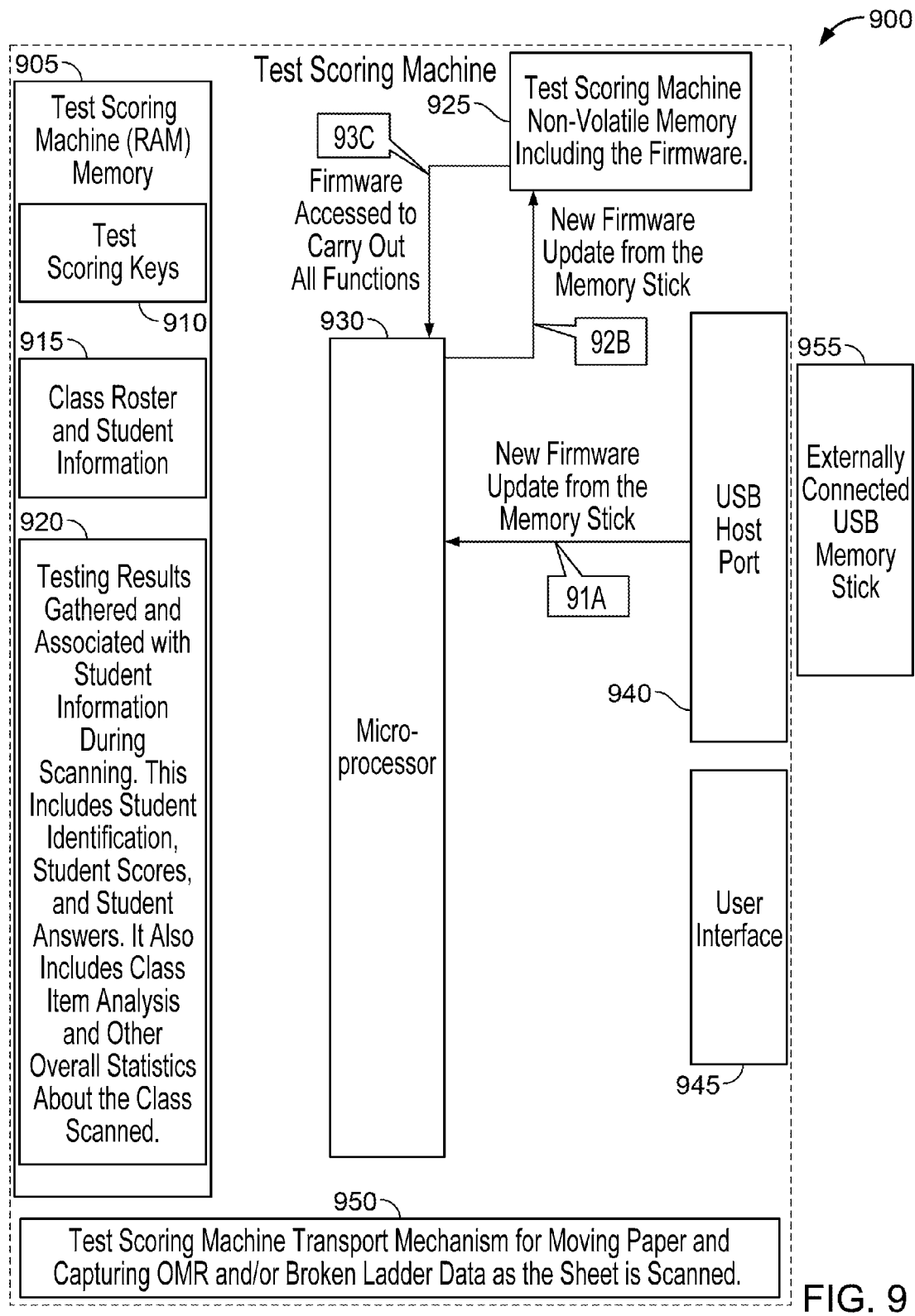
FIG. 9 shows an example of the system for transferring scanned data that is configured for updating firmware in the TSM via the USB memory stick.

FIG. 9 shows an example of the system for transferring scanned data that is configured for updating firmware in the TSM 900 via the USB memory stick 955. The TSM 900 includes a microprocessor 930, a USB host port 940, a user interface 945, nonvolatile memory 925 (e.g., Flash Memory, RAM) including the firmware, a transport mechanism 950 for moving paper and capturing OMR and/or broken ladder data as the form sheet is scanned. The TSM 900 includes a RAM 905, which can store test scoring keys 910, class roster and student information 915, and testing results 920. The testing results 920 can be gathered and associated with student information during scanning. The testing results 920 can include student identification, student scores, and student answers. The testing results 920 can also include class item analysis, test analysis, and other overall statistics about the class.

In an example of the operation of updating firmware in the TSM 900 via the USB memory stick 955, the microprocessor 930 recognizes updated data on the USB memory stick 955 and gathers updated firmware from the USB memory stick 955 (91A). The microprocessor 930 processes and sends instructions to write to the nonvolatile memory 925 in the TSM 900 to update the firmware (92B). Then, the microprocessor 930 restarts the TSM 900, and then utilizes the updated firmware for the functions of the TSM 900 (93C).

Figure 10:
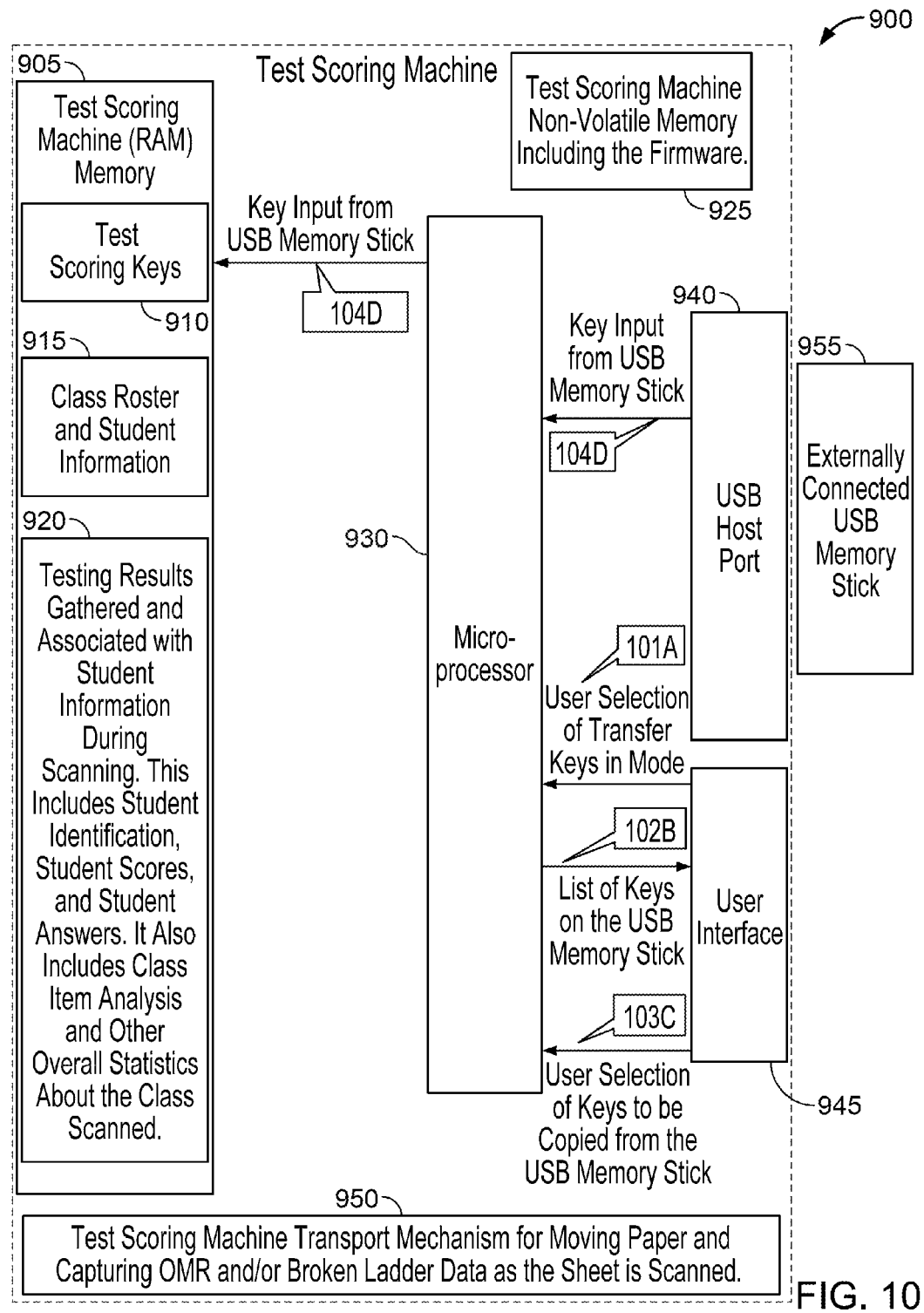
FIG. 10 shows an example of the system for transferring scanned data that is configured for transferring scoring keys from the USB memory stick to the random access memory (RAM) in the TSM.

FIG. 10 shows an example of the system for transferring scanned data that is configured for transferring scoring keys from the USB memory stick 955 to the random access memory (RAM) 905 in the TSM 900. The TSM 900 in FIG. 10 is similar to the TSM 900 in FIG. 9. When one or more scoring keys are transferred from the USB memory stick 955 to the random access memory (RAM) 905 in the TSM 900, the user interface 945 receives an input from the user to transfer the keys from the USB memory stick 955 by a selection of an "IN MODE" selector on the user interface 945 (101A) The microprocessor 930 processes and delivers instructions to a display on the user interface 945 including a list of scoring keys that are on the USB memory stick 955 (102B). The user interface 945 receives an input that a user has selected one or more scoring keys to transfer from USB memory stick 955 to the TSM 900 (103C). The microprocessor processes and send instructions to transfer the one or more selected scoring keys from the USB memory stick 955 to the USB host port 940 and to the RAM 905 within the TSM 900 so that the scoring keys 910 can be stored (104D).

Figure 11:
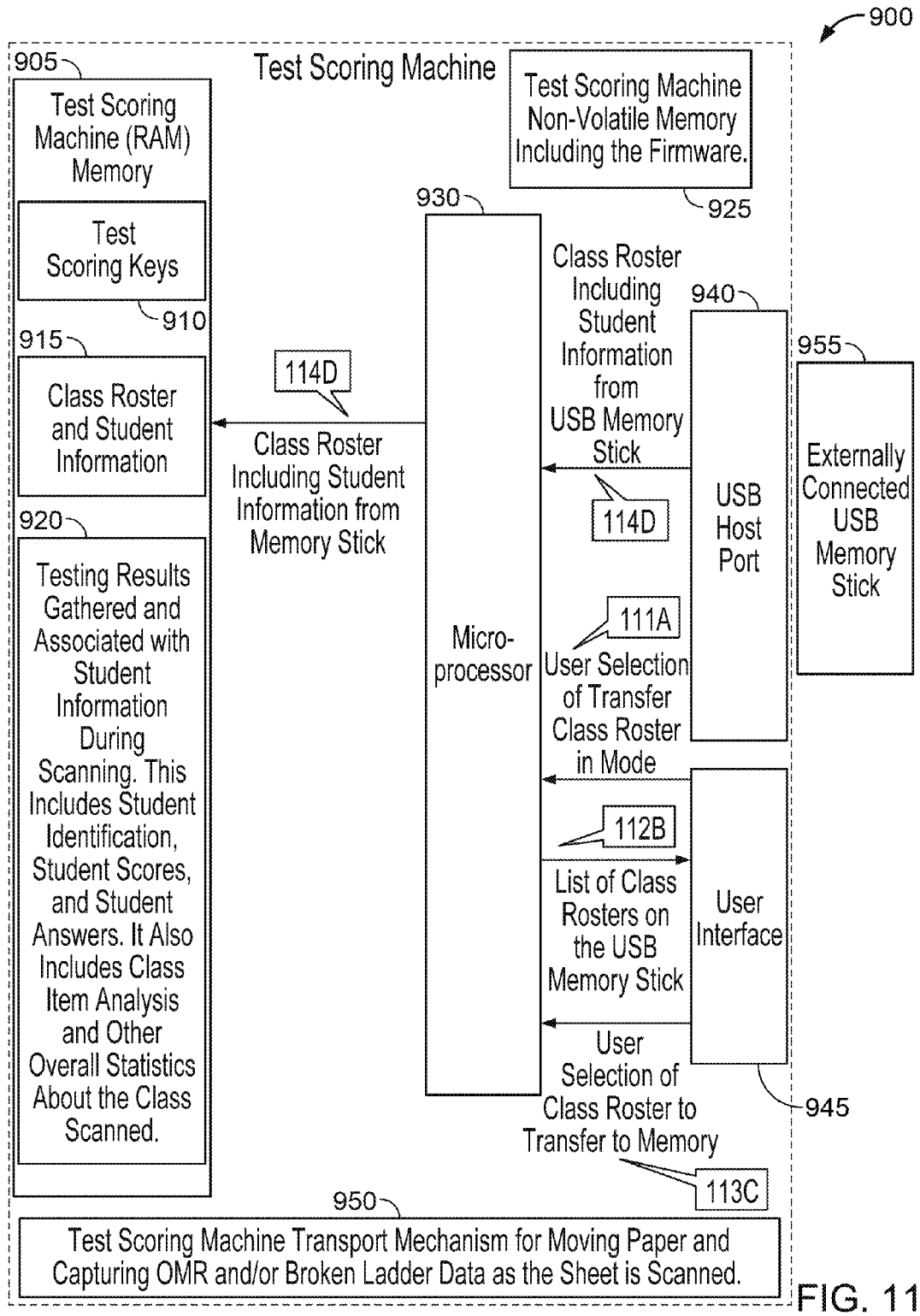
FIG. 11 shows an example of the system for transferring scanned data that is configured for transferring class roster information from the USB memory stick to the RAM in the TSM.

FIG. 11 shows an example of the system for transferring scanned data that is configured for transferring class roster information from the USB memory stick 955 to the RAM 905 in the TSM. The TSM 900 in FIG. 11 is similar to the TSM 900 in FIG. 9. The user interface 945 receives an input that the user has selected to transfer in the class roster information via selecting a "Transfer In Class Roster Mode" selector (111A). The microprocessor 930 processes and sends instructions to display on the user interface 945 a list of the class rosters that are on the USB memory stick 955 (112B). The user interface 945 receives a selection of the class roster from the user to transfer from the USB memory stick 955 (113C). The microprocessor 930 processes and send instructions to transfer the selected class roster from the USB memory stick 955 to the RAM 905 so that the class roster information 915 can be stored (114D).

Figure 12:
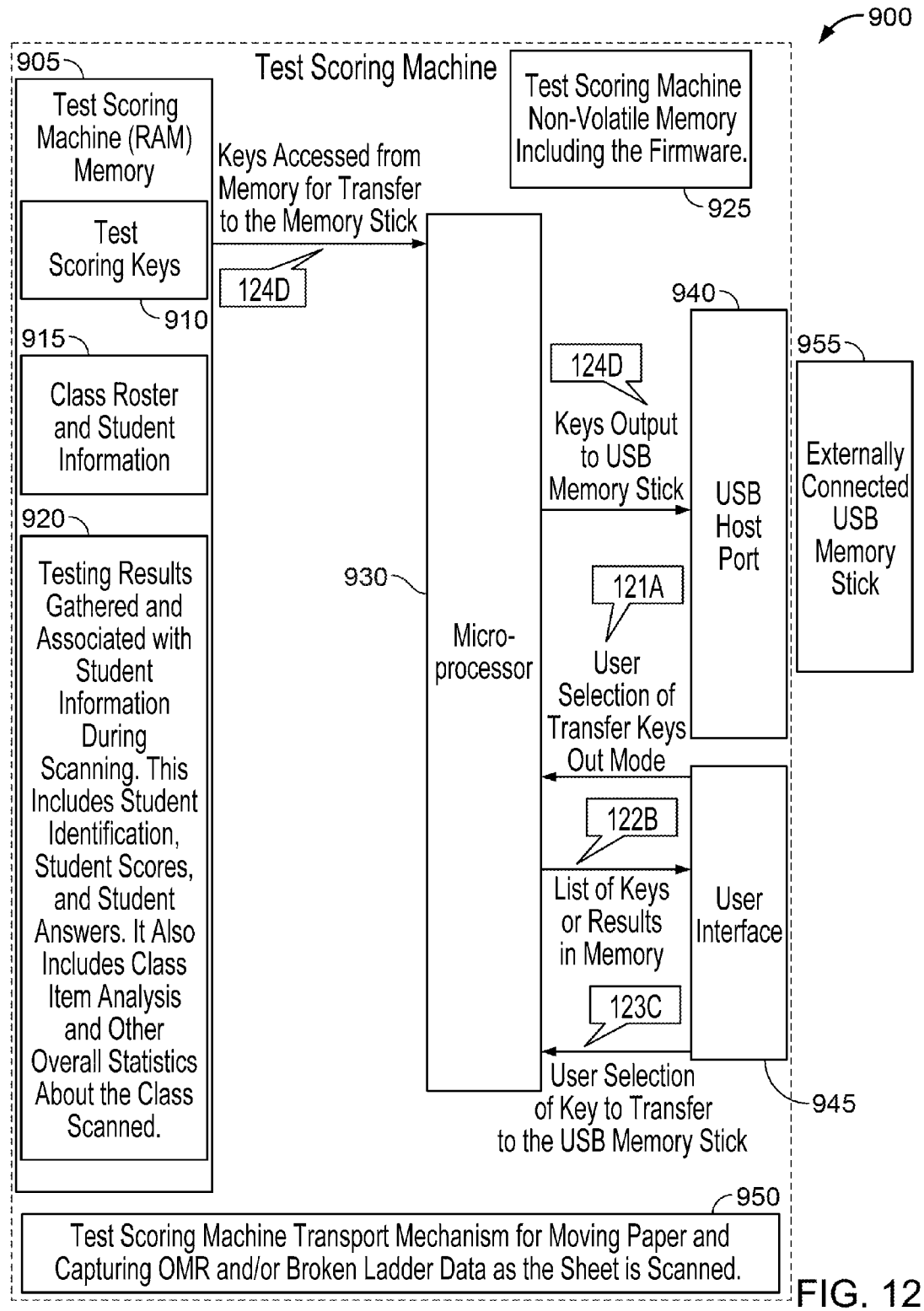
FIG. 12 shows an example of the system for transferring scanned data that is configured for transferring scoring keys from the RAM in the TSM to the USB memory stick.

FIG. 12 shows an example of the system for transferring scanned data that is configured for transferring scoring keys from the RAM 905 in the TSM 900 to the USB memory stick 955. In the transfer, the user interface 945 receives a user selection to transfer keys out of the TSM 900 with a selection of a "Transfer Keys Out Mode" selector (121A). The microprocessor 930 processes and sends instructions to display on the user interface 945 a list of scoring keys 910 that are contained in the RAM 905 (122B). The user interface 945 receives a selection from the user for one or more scoring keys to transfer from the RAM 905 to the USB memory stick 955 (123C). The microprocessor 930 processes and transmits instructions to transfer the one or more selected keys from the RAM 905 to the USB memory stick (124D).

Figure 13:
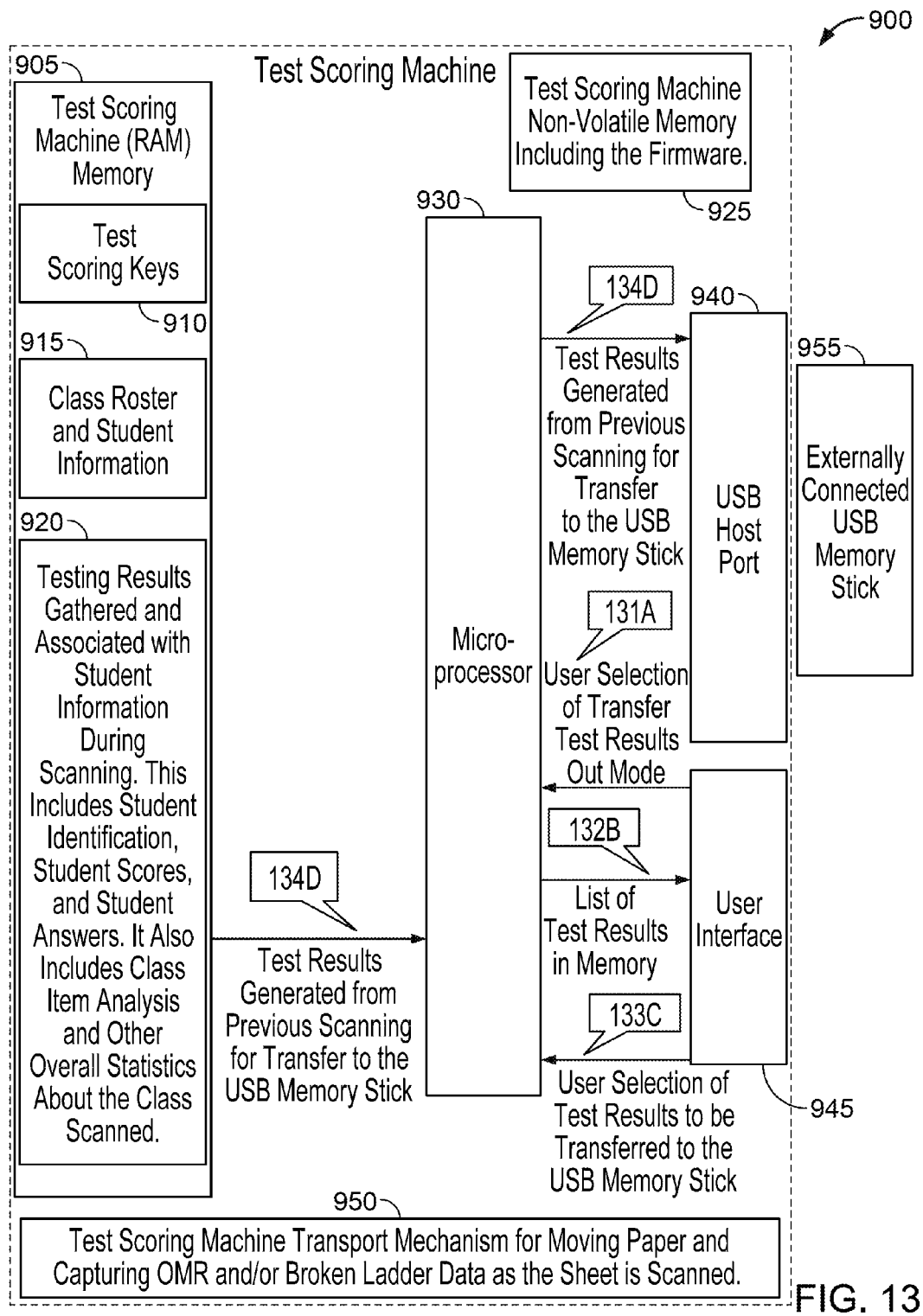
FIG. 13 shows an example of the system for transferring scanned data that is configured for transferring test results, student information and class information from the RAM in the TSM to the USB memory stick.

FIG. 13 shows an example of the system for transferring scanned data that is configured for transferring test results, student information and class information from the RAM 905 in the TSM 900 to the USB memory stick 955. In this transfer method, the user interface 945 receives a selection from a user to transfer the test results by a selection of a "Transfer Test Results Out Mode" selector (131A). The microprocessor 930 processes and transmits instructions to display in the user interface 945 a list of test results 920 stored in the RAM 905 (132B). The user interface 945 receives a selection from the user for a selection of the test results to transfer to the USB memory stick 955 (133C). The microprocessor processes and transmits instructions to transfer the selected test results 920 from the RAM 905 to the USB memory stick 955 (134D).

Figure 14:
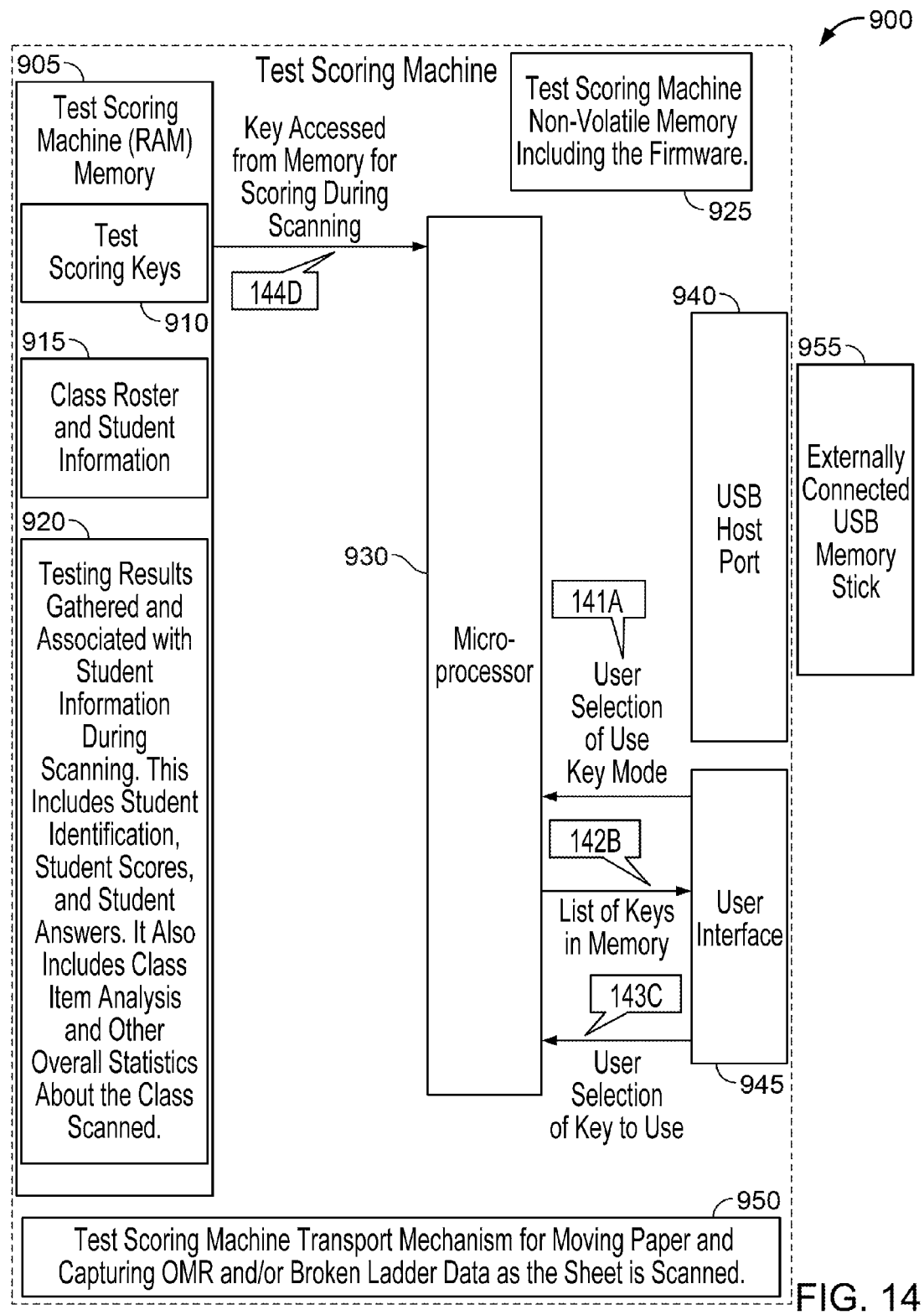
FIG. 14 shows an example of the system for transferring scanned data that is configured for scanning and capturing test results in the TSM with a user-selected scoring key.

FIG. 14 shows an example of the system for transferring scanned data that is configured for scanning and capturing test results in the TSM 900 with a user-selected scoring key. In an example of the transfer method, the user interface 945 receives a user input for the user-selected scoring key by selecting a "Use Key Mode" selector on the user interface 945 (141A). The microprocessor 930 processes and transmits instructions to display on the user interface 945 one or more scoring keys 910 (e.g., a list of scoring keys) stored in the RAM 905 of the TSM 900 (142B). The user interface 945 receives a user input for a selected scoring key (143C). The microprocessor processes instructions to access the selected scoring key to use during the next scanning session and prepares the TSM 900 to scan and capture test results from the test form (144D).

Figure 15:
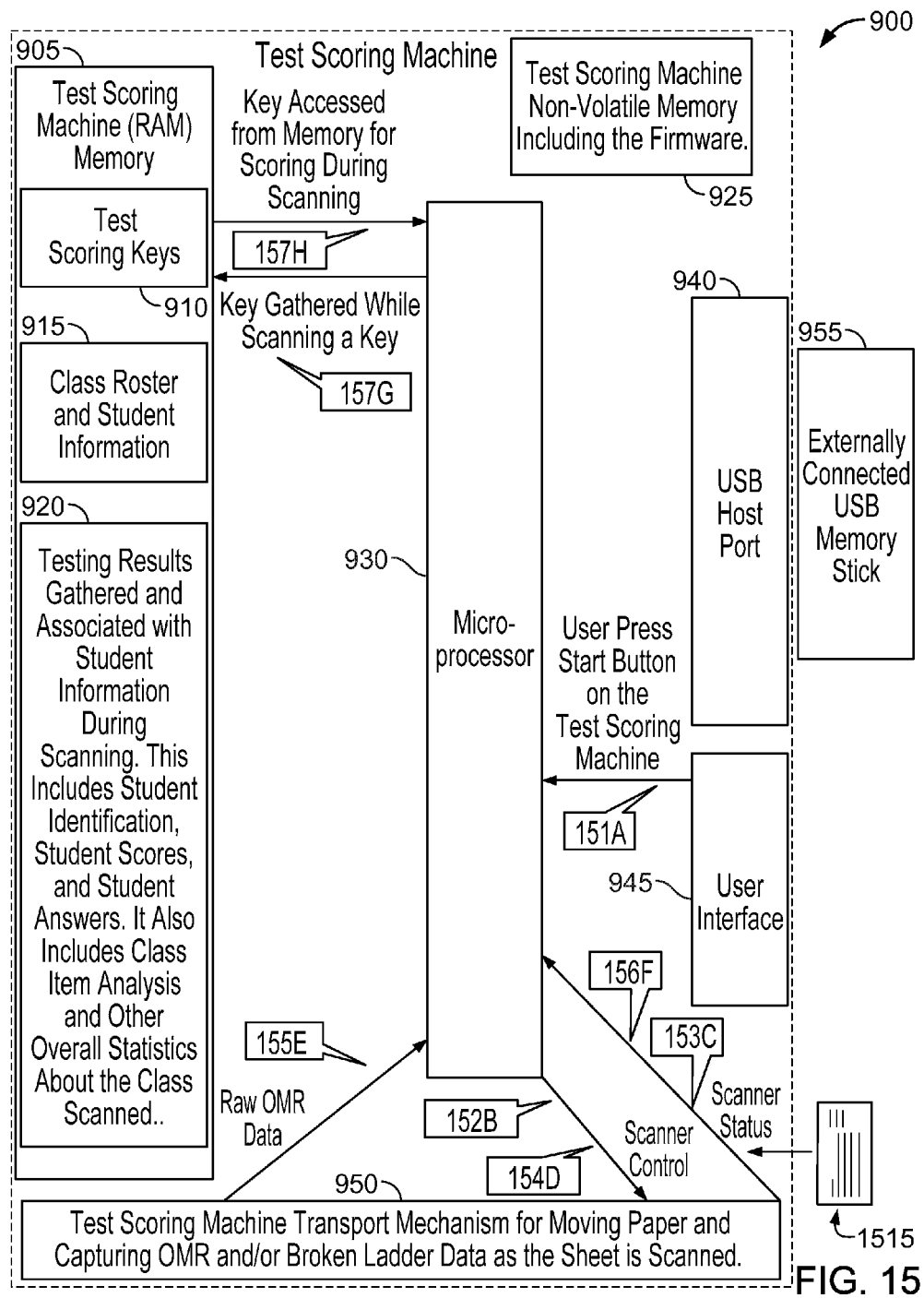
FIG. 15 shows an example of the system for transferring scanned data that is configured for scanning and capturing test results in the TSM with a scanned scoring key.

FIG. 15 shows an example of the system for transferring scanned data that is configured for scanning and capturing test results in the TSM 900 with a scanned scoring key. In this example for transferring scanned data, the user interface 945 or a start button receives a start request from a user to start the operations of the TSM 900 (151A). The microprocessor 930 prepares the TSM 900 to scan and capture a scoring key from a scoring key form 1515 using the scanner control (152B). In some implementations, the scoring key form 1515 may be a specially-marked test form. The TSM 900 receives the scoring key form 1515 in the transport mechanism 950. The microprocessor 930 recognizes that scanning has been initiated via a scanner status indicator (153C) and processes instructions to use the scanner control to start the scanning of the form (154D). OMR data is scanned and captured from the scoring key form 1515 and sent to the microprocessor (155E). The microprocessor 930 accesses a scanning status indicator to identify whether the forms should be re-scanned if an error occurred, or if the microprocessor 930 can proceed to process the scanned OMR data if no error occurred and/or if the form has been completely and correctly fed into the TSM 900 (156F). If the scoring key form 1515 was completely and correctly fed into the TSM 900, then the microprocessor 930 resolves OMR data captured during scanning the scoring key form 1515 and creates a scoring key with the resolved OMR data (157G). The scoring key 910 is saved in the RAM 905 as the active scoring key to be used during the next test data scanning session (158H). The microprocessor 930 then can process instructions to prepare the TSM 900 to scan and capture test results and answers from test forms from students.

Figure 16:
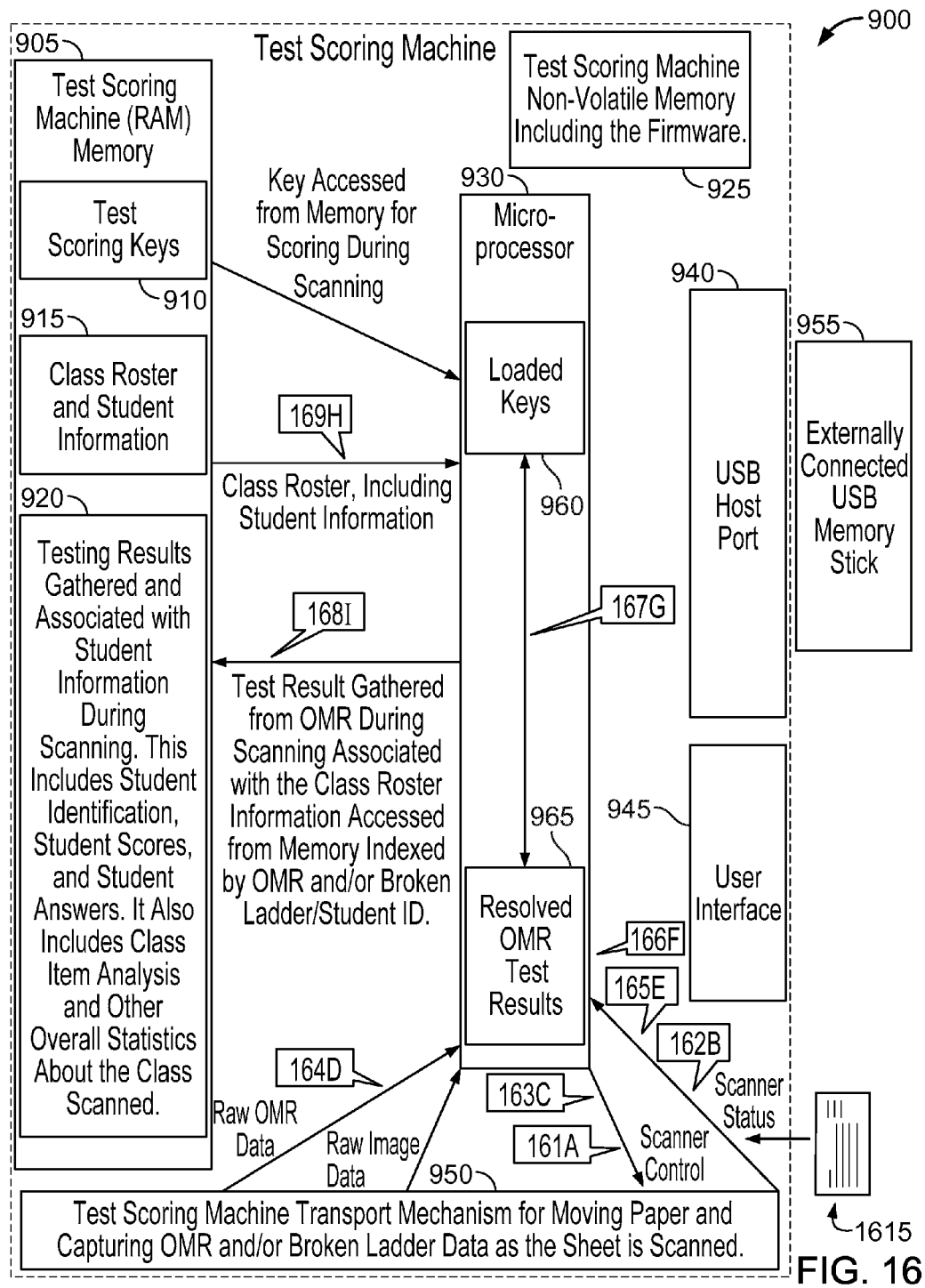
FIG. 16 shows an example of the system for transferring scanned data that is configured for scanning and capturing test results in the TSM.

FIG. 16 shows an example of the system for transferring scanned data that is configured for scanning and capturing test results in the TSM 900. In this example for transferring scanned data, the user interface 945 detects if a valid key has been selected by a user or by the TSM 900 for the microprocessor 930 to process instructions to prepare the TSM 900 to scan and capture OMR data from a test form 1615 using the scanner control (161A). The TSM 900 receives the test form 1615 in the machine transport 950, and the test form 1615 is recognized by the microprocessor 930 via a scanner status indicator (162B). The microprocessor 930 processes instructions to use the scanner control to start the scanning of the form (163C). The OMR and/or Broken Ladder image data is captured by the microprocessor 930 during scanning (164D). The microprocessor 930 processes instructions to use the scanner status indicator to identify whether test form sheet 1615 should be rescanned if an error occurred when the test form sheet 1615 was fed into the TSM 900, or if the test form sheet 1615 does not have to be rescanned if an error did not occur (165E). If the test form sheet 1615 was fed successfully into the TSM 900, the microprocessor 930 processes instructions to resolve the OMR data captured during the scanning from the scanned test form 1615 to access the answers for the student taking the test (166F). The microprocessor 930 also processes instructions to compare the student's responses against the active scoring key, which either can be scanned into the TSM 900 or selected from the RAM 905, to generate the score for the student's test (167G). The microprocessor 930 can also process instructions to perform the item analysis for the student's and class performance on the test (167G). The microprocessor 930 then processes instructions to determine the student ID number, as well as other information about the student who took the test, such as their class information, by using the instructions to gather student data by using the broken ladder on the test form OMR data gathered during the scanning (169H). The microprocessor can process 1615 to determine the offset for the class roster and/or student ID (1681). The microprocessor 930 can process instructions to store the test results in the RAM 905, along with the student and class information accessed previously (1681).

Although only a few implementations have been disclosed in detail above, other implementations are possible and the inventor(s) intend these to be encompassed within this specification. The specification describes a few specific examples to accomplish a more general goal that may be accomplished in another way. This disclosure is intended to be exemplary, and the claims are intended to cover any modification or alternative which might be predictable to a person having ordinary skill in the art.

In some implementations, the collection of the response data can occur in a networked environment. While the techniques of collecting responses are described in terms of methods, systems for implementing the techniques are also possible, using computer and/or scanner technology.

The disclosed techniques can be used on one or more computers. One or more methods and/or algorithms and/or processes herein can be implemented with, or employed in computers and/or video display, transmission, processing, and playback systems. The computers described herein may be any kind of computer, either general purpose, or some specific purpose computer such as a workstation. The computer may be, e.g., an Intel or AMD based computer, running Windows, Linux, or may be a Macintosh computer. In some implementations, the computer can also be, e.g., a handheld computer, such as a PDA, cell phone, or laptop. The computer may also refer to machines or parts of a machine for image recording or reception processing, storage, and distribution of data, in particular video data.

Computer and/or graphic programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network, for example, with a server or other machine sending communications to the local machine, which allows the local machine to carry out the operations described herein.

Implementations of the subject matter and the functional operations described in this specification can be implemented in digital electronic circuitry, or in computer software, firmware, or hardware, including the structures disclosed in this specification and their structural equivalents, or in combinations of one or more of them. Some implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a graphical system, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows and figures described and shown in this specification can be performed by one or more programmable processors executing one or more computer programs to perform functions by operating on input data and generating output. The processes and logic flows can also be performed by, and apparatus can also be implemented as, special purpose logic circuitry, e.g., PLD (programmable logic device) or an ASIC (application specific integrated circuit).

Processors suitable for the execution of a computer program include, by way of example, both general and special purpose microprocessors, and any one or more processors of any kind of digital computer. Generally, a processor can receive instructions and data from a read only memory or a random access memory or both. The essential elements of a computer are a processor for performing instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, some implementations of the subject matter described in this specification can be implemented on a computer and/or a TSM having a display device, e.g., a CRT (cathode ray tube), LCD (liquid crystal display), or plasma display monitor, for displaying information to the user and a keyboard and a selector, e.g., a pointing device, a mouse, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Some implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet. In some implementations, the TSM can be a stand-alone apparatus, and the stand-alone TSM may not be connected to a network or a PC.

The computing system can include clients and servers. A client and server are generally remote from each other and typically interact through a communication network. The relationship of client and server arises by virtue of computer programs running on the respective computers and having a client-server relationship to each other.

Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software or hardware product or packaged into multiple software or hardware products.

Other modifications are within the scope of the following claims.

What is claimed is:

1. A scannable form comprising:
   at least one response column parallel to a first longitudinal edge of the scannable form;
   a control mark column parallel to the first longitudinal edge and parallel to the response column; and
   a broken ladder, independent of the control mark column, comprising a preprinted frame of two substantially parallel lines and locations along the two substantially parallel lines for a plurality of rungs corresponding to encoded information that identifies a person assigned to the scannable form,
   wherein the preprinted frame of the two substantially parallel lines is configured to be scanned by a test scoring machine to cause detection of the broken ladder on the scannable form, and a top rung of the broken ladder is positioned along the two substantially parallel lines so that the top rung is positioned to be a first rung that is scanned by the test scoring machine for the broken ladder, and a bottom rung of the broken ladder is positioned along the two substantially parallel lines so that the bottom rung is positioned to be a last rung that is scanned by the test scoring machine for the broken ladder.

2. The scannable form of claim 1, wherein the encoded information comprises an offset value to at least one student identification (ID) number in a class roster.

3. The scannable form of claim 1, wherein a number of offset values in the broken ladder is represented by a number of rungs between the top rung and the bottom rung in the broken ladder.

4. A scannable form comprising:
   a. an elongated rectangular shape with first and second substantially straight longitudinal edges;
   b. at least one response column parallel to the first longitudinal edge;
   c. a control mark column, parallel to the first longitudinal edge and parallel to the response column but spaced therefrom, the control mark column containing, in a direction parallel to the first longitudinal edge:
      (1) a first set of response control marks having a first length;
      (2) a second set of response control marks having the first length;
      (3) a start-of-form mark having a second length different from the first length; and
      (4) an end-of-form mark having a third length different from the first length and the second length;
      the first set of response control marks being column aligned with the start-of-form mark and before the second set of response control marks, the start-of-form mark being column aligned before the second set of response control marks, and the second set of response control marks being column aligned before the end-of-form mark; and
   d. a broken ladder, independent of the control mark column, comprising a preprinted frame of two substantially parallel lines and locations along the two substantially parallel lines for a plurality of rungs corresponding to encoded information that identifies a person assigned to the scannable form, wherein the preprinted frame of the two substantially parallel lines is configured to be scanned by a test scoring machine to cause detection of the broken ladder on the scannable form.

5. The scannable form of claim 4, wherein the broken ladder comprises a plurality of unconnected rungs, wherein the unconnected rungs in broken ladder are configured to be connected with a mark in an unconnected location between the rungs.

6. The scannable form of claim 4, wherein two or more of the rungs in the broken ladder represents a number of bits for the encoded information.

7. The scannable form of claim 4, wherein one or more rungs represent a binary number, wherein a value of the binary number for each of the one or more rungs depends on whether the rung is connected or unconnected.

8. The scannable form of claim 4, wherein the broken ladder is configured to be read with the test scoring machine that determines the encoded information from the broken ladder.

9. The scannable form of claim 8, wherein the broken ladder is positioned at a leading edge of the scannable form that is at an area of the scannable form that is fed into the test scoring machine upon scanning.

10. The scannable form of claim 9, wherein a top rung and a bottom rung are connected rungs, wherein the top rung defines an area for the test scoring machine to recognize that scanning has commenced for data for the broken ladder, and wherein the bottom rung defines an area for the test scoring machine to recognize that the data for the broken ladder has been completely scanned.

11. The scannable form of claim 9, wherein a top rung is positioned on the scannable form so that the top rung is a first rung that is scanned by the test scoring machine for the broken ladder, and a bottom rung is positioned so that the bottom rung is a last rung scanned by the test scoring machine for the broken ladder.

12. The scannable form of claim 11, wherein a number of rungs between the top and bottom rungs represent a number of bits of the encoded information.

13. The scannable form of claim 4, wherein the encoded information represents an offset number corresponding to student identification numbers in a class roster.

14. The scannable form of claim 13, wherein the scannable form further comprises an offset area on the scannable form for printing the offset number on the scannable form.

15. A test scoring machine comprising:
a graphical user interface (GUI) for receiving user data;
a scanner bed path for receiving a scannable form having a control mark column and a broken ladder independent of the control mark column, wherein the broken ladder comprises a preprinted frame of two substantially parallel lines and a plurality of rungs along the substantially parallel lines, the plurality of rungs corresponding to encoded information that identifies a person assigned to the scannable form;
a sensor for reading the broken ladder on the scannable form and producing image data for the broken ladder;
a memory unit to store information corresponding to the broken ladder; and
a processor to process the image data and information from the memory unit to generate information that identifies the person assigned to the scannable form, wherein the processor is configured to process the image data for the broken ladder by detecting the preprinted frame of two substantially parallel lines to detect the broken ladder on the scannable form.

16. The test scoring machine of claim 15, wherein a top rung and a bottom rung on the broken ladder are connected rungs, wherein the top rung defines an area for the test scoring machine to recognize that scanning has commenced for data for the broken ladder, and wherein the bottom rung defines an area for the test scoring machine to recognize that the data for the broken ladder has been completely scanned.

17. The scannable form of claim 15, wherein a top rung is positioned on the scannable form so that the top rung is a first rung that is scanned by the test scoring machine for the broken ladder, and the bottom rung is positioned so that the bottom rung is a last rung scanned for the broken ladder.

18. A scannable form comprising:
at least one response area to receive a response mark on the scannable form for reading by a test scoring machine;
a control mark column configured to receive a plurality of control marks; and
a broken ladder, independent of the control mark column, comprising a preprinted frame of two substantially parallel lines and locations along the two substantially parallel lines for a plurality of rungs corresponding to encoded information that associates the scannable form with a unique identifier that identifies a person assigned to the scannable form, wherein the preprinted frame of the two substantially parallel lines is configured to be scanned by the test scoring machine to cause detection of the broken ladder on the scannable form.

19. The scannable form of claim 18, wherein the response area is to be completed by the person assigned to the scannable form.

20. The scannable form of claim 18, wherein the unique identifier comprises binary information associated with an identification number for the person assigned to the scannable form.

21. A test scoring machine comprising:
a transport mechanism for receiving a scannable form having a control mark column, a broken ladder independent of the control mark column, and at least one response area to receive a response mark on the scannable form;
an optical mechanism for reading data from the scannable form, including data from the broken ladder and the at least one response area, wherein the broken ladder comprises a preprinted frame of two substantially parallel lines and locations along the two substantially parallel lines for a plurality of rungs corresponding to encoded information that associates the scannable form with a unique identifier that identifies a person assigned to the scannable form;
a processor for processing the data read from the scannable form, wherein the processor is configured to process the data read from the scannable form by detecting the two substantially parallel lines to detect the broken ladder on the scannable form; and
a memory unit to store the processed data.

22. The test scoring machine of claim 21, wherein when reading data from the broken ladder, the test scoring machine is configured to first read a top rung of the broken ladder and last read a bottom rung of the broken ladder.

23. The test scoring machine of claim 21, wherein when reading data from the broken ladder, the test scoring machine is configured to simultaneously read data from all rungs from the broken ladder.

24. The test scoring machine of claim 21, wherein the encoded information comprises an offset value to at least one student identification (ID) number in a class roster.

25. A scannable test form comprising:
at least one response column parallel to a first longitudinal edge of the scannable test form;
a control mark column parallel to the first longitudinal edge and parallel to the response column; and
a broken ladder diagram, independent of the control mark column, comprising a preprinted frame of two substantially parallel lines separated by a first distance, wherein the two parallel lines are configured to be connected at substantially equidistance locations along the parallel lines with one or more rungs that are perpendicular to the two parallel lines, wherein the broken ladder diagram corresponds to encoded information that associates the scannable test form with an identifier that identifies a person assigned to the scannable test form, and the preprinted frame of the two substantially parallel lines is configured to be scanned by a test scoring machine to cause detection of the broken ladder diagram on the scannable test form.

26. The scannable test form of claim 25, wherein the broken ladder diagram is configured to have a maximum number of rungs that corresponds to a number of encoded bits.

27. The scannable test form of claim 25, wherein the identifier is configured to have information relating to a number of connected rungs and a number of unconnected rungs on the broken ladder diagram.

28. The scannable test form of claim 25, wherein the identifier is configured to have information relating to encoded bits corresponding to binary data represented by connected rungs and unconnected rungs on the broken ladder.

29. The scannable test form of claim 25, wherein the broken ladder diagram is configured to have the rungs to be connected via a pencil mark to be read by the test scoring machine.

30. The scannable test form of claim 25, wherein the broken ladder diagram is configured to have the rungs to be connected via an ink mark to be read by the test scoring machine.

31. The scannable test form of claim 25, further comprising a top rung positioned on the scannable test form so that the top rung is a first rung that is scanned by the test scoring machine for the broken ladder, and a bottom rung is positioned so that the bottom rung is a last rung that is scanned by the test scoring machine for the broken ladder diagram.

32. The scannable test form of claim 31, wherein between the top and bottom rungs, the broken ladder diagram is configured such that a user of the form can connect the one or more rungs to the parallel lines at the locations along the parallel lines.

33. The scannable test form of claim 31, wherein between the top and bottom rungs, the broken ladder diagram is configured to have the one or more rungs to connect to the parallel lines at the locations by a printing device.

34. The scannable test form of claim 25, wherein the broken ladder diagram is configured such that a user of the form can connect the one or more rungs to the parallel lines at the locations along the parallel lines.

35. The scannable test form of claim 25, the broken ladder diagram is to have the one or more rungs to connect to the parallel lines at the locations by a printing device.

36. The scannable test form of claim 25, wherein the encoded information represents an offset number corresponding to student identification numbers in a class roster.

37. A scannable form comprising:
at least one response column parallel to a first longitudinal edge of the scannable form; and
a broken ladder comprising a preprinted frame of two substantially parallel lines and consecutive locations along the two substantially parallel lines for a plurality of rungs corresponding to encoded information that identifies a person assigned to the scannable form,
wherein the preprinted frame of the two substantially parallel lines is configured to be scanned by a test scoring machine to cause detection of the broken ladder on the scannable form, and a top rung of the broken ladder is positioned along the two substantially parallel lines so that the top rung is positioned to be a first rung that is scanned by the test scoring machine for the broken ladder, and a bottom rung of the broken ladder is positioned along the two substantially parallel lines so that the bottom rung is positioned to be a last rung that is scanned by the test scoring machine for the broken ladder.

38. The scannable form of claim 37, wherein the encoded information comprises an offset value to at least one student identification (ID) number in a class roster.

39. The scannable form of claim 37, wherein a number of offset values in the broken ladder is represented by a number of rungs between the top rung and the bottom rung in the broken ladder.

* * * * *

UNITED STATES PATENT AND TRADEMARK OFFICE
CERTIFICATE OF CORRECTION

PATENT NO. : 8,718,535 B2  Page 1 of 1
APPLICATION NO. : 13/015755
DATED : May 6, 2014
INVENTOR(S) : Todd Nelson Radtke, Hugh Eugene Watson and Jason Lee Sprenger It is certified that error appears in the above-identified patent and that said Letters Patent is hereby corrected as shown below:

In the Claims

In Claim 17, column 24, line 3, delete "the scannable form" and insert -- The test scoring machine -- therefor.

Signed and Sealed this
Nineteenth Day of August, 2014

Michelle K. Lee
*Deputy Director of the United States Patent and Trademark Office*